US011529857B2

(12) United States Patent
Seong et al.

(10) Patent No.: US 11,529,857 B2
(45) Date of Patent: Dec. 20, 2022

(54) COVER FOR DOOR FRAME OF VEHICLE

(71) Applicants:Hyundai Motor Company, Seoul (KR); Kia Motors Corporation, Seoul (KR)

(72) Inventors: Jee Hoon Seong, Gyeonggi-do (KR); Jeong Hyeon Kim, Seoul (KR); Yong Hyun Nam, Gyeonggi-do (KR); Seong Hun Kim, Gyeonggi-do (KR); In Hyo Yun, Gyeonggi-do (KR); Jun Ho Lee, Gyeonggi-do (KR); Je Hyoung Chun, Gyeonggi-do (KR); Young Hak Kim, Gyeongsangnam-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 655 days.

(21) Appl. No.: 16/546,975

(22) Filed: Aug. 21, 2019

(65) Prior Publication Data
US 2020/0122558 A1    Apr. 23, 2020

(30) Foreign Application Priority Data

Oct. 23, 2018   (KR) .......................... 10-2018-0126937

(51) Int. Cl.
| | | |
|---|---|---|
| *E06B 7/16* | (2006.01) | |
| *B60J 10/76* | (2016.01) | |
| *B60J 10/21* | (2016.01) | |
| *B60J 5/04* | (2006.01) | |

(52) U.S. Cl.
CPC ............. *B60J 10/76* (2016.02); *B60J 5/0402* (2013.01); *B60J 10/21* (2016.02)

(58) Field of Classification Search
CPC ............ B60J 10/76; B60J 10/21; B60J 10/80; B60J 10/35; B60J 10/78; B60J 5/0402; B60J 5/0493; B60R 13/04; B29C 45/14344; B29C 2045/1486
USPC ......................................................... 49/479.1
See application file for complete search history.

(56) References Cited

U.S. PATENT DOCUMENTS

| | | | | |
|---|---|---|---|---|
| 5,839,232 A * | 11/1998 | Backes | ..................... | B60J 10/79 49/475.1 |
| 6,240,677 B1 * | 6/2001 | Baumann | .................. | B60J 10/79 49/479.1 |
| 6,598,348 B2 * | 7/2003 | Palicki | ..................... | B60J 10/30 49/492.1 |
| 7,650,718 B2 * | 1/2010 | Eguchi | ........................ | B60J 1/08 49/492.1 |
| 8,051,606 B2 * | 11/2011 | Maaß | ....................... | B60J 10/74 49/479.1 |
| 8,104,229 B2 * | 1/2012 | Minami | .................. | B60J 10/265 49/441 |

(Continued)

FOREIGN PATENT DOCUMENTS

| | | | |
|---|---|---|---|
| EP | 1245421 A2 * | 10/2002 | ............. B60J 10/21 |
| JP | H02-1691 B2 | 1/1990 | |

(Continued)

*Primary Examiner* — Jerry E Redman
(74) *Attorney, Agent, or Firm* — Fox Rothschild LLP

(57) ABSTRACT

A cover for a door frame includes: a sealing member mounted to the door frame; and an inner cover covering at least a portion of the sealing member and at least a portion of the door frame, where a portion of the corner cover is embedded in the sealing member so that the inner cover and the sealing member form a unitary one-piece structure.

12 Claims, 24 Drawing Sheets

(56) References Cited

U.S. PATENT DOCUMENTS

| | | | |
|---|---|---|---|
| 8,256,163 B2* | 9/2012 | Eguchi | B60J 1/08 |
| | | | 49/492.1 |
| 8,434,267 B2* | 5/2013 | Bocutto | B60J 10/70 |
| | | | 49/495.1 |
| 8,479,449 B2* | 7/2013 | Titz | B60J 10/78 |
| | | | 49/440 |
| 8,646,213 B2* | 2/2014 | Suzuki | B60J 10/78 |
| | | | 49/479.1 |
| 9,649,921 B2* | 5/2017 | Bessho | E05D 15/165 |
| 9,845,001 B1 | 12/2017 | Kojima et al. | |
| 10,336,169 B2* | 7/2019 | Kanphade | B60J 10/18 |
| 10,787,063 B2* | 9/2020 | Sugawa | B60J 10/76 |
| 11,117,456 B2* | 9/2021 | Krefta | B60J 10/21 |
| 2002/0139054 A1* | 10/2002 | Schlachter | B60J 10/88 |
| | | | 49/479.1 |
| 2008/0265615 A1* | 10/2008 | Eguchi | B60J 1/08 |
| | | | 296/146.2 |
| 2009/0021044 A1* | 1/2009 | Maab | B60J 10/21 |
| | | | 49/506 |
| 2009/0108625 A1* | 4/2009 | Minami | B60J 10/265 |
| | | | 49/490.1 |
| 2010/0126077 A1* | 5/2010 | Eguchi | B60J 1/08 |
| | | | 49/479.1 |
| 2016/0214471 A1* | 7/2016 | Bessho | B60J 5/0419 |
| 2019/0031004 A1* | 1/2019 | Kanphade | B60J 10/21 |
| 2019/0061486 A1* | 2/2019 | Sugawa | B60J 10/26 |

FOREIGN PATENT DOCUMENTS

| | | |
|---|---|---|
| JP | H06-286464 A | 10/1994 |
| JP | H08-127249 A | 5/1996 |
| JP | H08230487 A | 9/1996 |
| JP | 2528310 Y2 | 3/1997 |
| JP | 2001-030768 A | 2/2001 |
| JP | 2007-091010 A | 4/2007 |
| JP | 4612486 B2 | 1/2011 |

* cited by examiner

COVER FOR DOOR FRAME OF VEHICLE

CROSS-REFERENCE TO RELATED APPLICATION

This application claims under 35 U.S.C. § 119(a) the benefit of Korean Patent Application No. 10-2018-0126937, filed on Oct. 23, 2018 in the Korean Intellectual Property Office, the entire contents of which are incorporated by reference herein.

BACKGROUND

(a) Technical Field

The present disclosure relates to a cover for a door frame of a vehicle, more particularly, to the cover that is constructed to minimize wind noise with an improved appearance and easy of assembly.

(b) Description of the Related Art

The doors of a vehicle typically include a door panel and a door frame connected to the door panel. The door frame defines a window opening which is opened and closed by a door glass, and a door glass run is attached to the door frame.

The door includes an inner cover covering at least portions of the door frame and the door glass run. The inner cover is configured to cover inboard side portions of the door frame and the door glass run. The inner cover may be a corner cover that is attached and covers a corner portion of the door frame and a corner portion of the door glass run. The corner cover has a mounting clip, and the door frame has a mounting hole to which the mounting clip of the corner cover is coupled.

However, moisture, wind noise, and the like may easily be introduced into the mounting hole of the door frame, thereby deteriorating sealing between the door frame and the corner cover, and thus negatively impacting noise performance.

In addition, the corner cover, the door frame, and the door glass run typically are individually manufactured. When the corner cover is assembled to the door frame and the door glass run, it may not be easy to match the corner cover, the door frame, and the door glass run. In particular, due to manufacturing tolerances of the corner cover, the door frame, and the door glass run, matching of the three components may not be accurate. For example, the corner cover may come off the door frame and the door glass run, or may not be flushed with the door frame and the door glass run. In addition, quality scattering may occur in the mounting hole of the door frame, resulting in mounting failure of the corner cover.

As the corner cover, the door frame, and the door glass run are individually manufactured, the manufacturing costs may increase and easy of assembly may deteriorate.

The above information described in this background section is provided to assist in understanding the background of the inventive concept, and may include any technical concept which is not considered as the prior art that is already known to those skilled in the art.

SUMMARY

An aspect of the present disclosure provides a cover for a door frame, the cover configured to allow a corner cover to be integrally formed with or molded with a sealing member mounted to the door frame, thereby reducing manufacturing costs and improving ease of assembly.

According to an aspect of the present disclosure, a cover for a door frame may include: a sealing member mounted to the door frame; and an inner cover covering at least a portion of the sealing member and at least a portion of the door frame, wherein a portion of the inner cover may be embedded in the sealing member so that the inner cover and the sealing member form a unitary one-piece structure.

The inner cover may include: an embedded portion which is embedded in the corner portion of the sealing member; an extension wall which extends from the embedded portion toward an interior space of the vehicle; an inboard side wall which is bent at a predetermined angle from the extension wall; and a clip portion which extends from the inboard side wall toward an outside of the vehicle, wherein the clip portion elastically covers at least a portion of an outer peripheral wall of the door frame.

The clip portion may be elastically coupled to the outer peripheral wall of the door frame when the sealing member is mounted to the door frame.

The inboard side wall of the inner cover may have a first contact surface contacting an inboard side wall of the door frame, and the clip portion of the inner cover may have a second contact surface contacting the outer peripheral wall of the door frame.

A first angle of inclination between the first contact surface and the second contact surface may be less than a second angle of inclination between the first contact surface and the outer peripheral wall of the door frame.

The clip portion of the inner cover may have a gradually reduced thickness toward a free end thereof.

The clip portion of the inner cover may further include a chamfer provided at a free end thereof, and the chamfer may be inclined at an obtuse angle with respect to the outer peripheral wall of the door frame.

The corner portion of the sealing member may include an encapsulation surrounding the embedded portion of the inner cover.

The embedded portion of the inner cover may have a support protrusion, and an axis of the support protrusion may be perpendicular to an axis of the embedded portion.

The support protrusion may have at least one first through hole which is filled with a molten material in an insert molding process.

The embedded portion may have at least one second through hole which is filled with a molten material in the insert molding process, and an axis of the second through hole may be perpendicular to an axis of the first through hole.

The inner cover and the sealing member may be made of materials having high chemical affinity.

In one embodiment, the sealing member is a door glass run attached to an inner periphery of the door frame, the inner cover has a shape corresponding to the corner portion of the door glass run, and a portion of the inner cover is embedded in the door glass run so that the inner cover and the door glass run form the unitary one-piece structure.

In another embodiment, the sealing member is a door glass run attached to an inner periphery of the door frame, the door frame includes a first extending portion extending along a first direction, the second extending portion extending along a second direction, a corner portion connecting between the first extending portion and the second extending portion, and the inner cover includes a corner cover portion covering the corner portion of the door frame, a first extending cover portion covering the first extending portion of the door frame, a second extending cover portion covering the second extending portion of the door frame.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
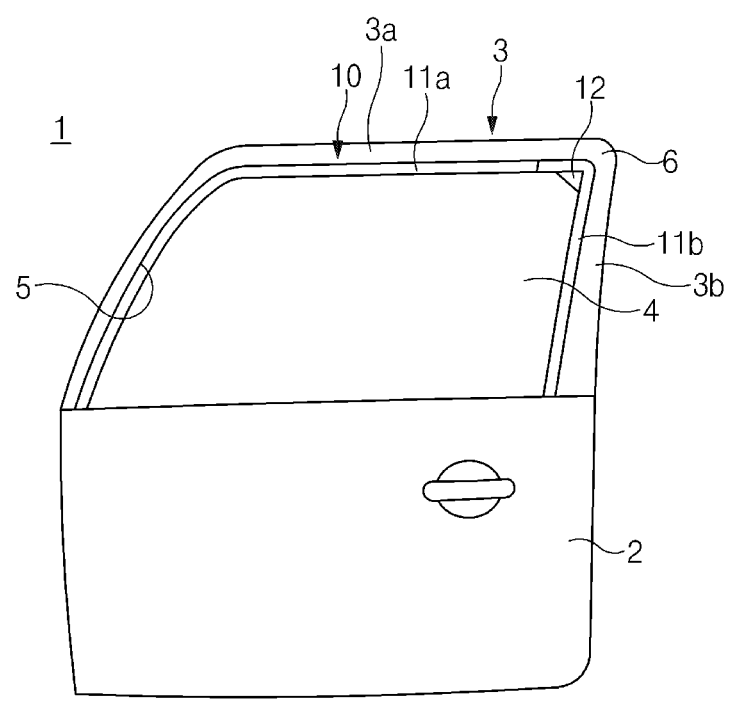
FIG. 1 illustrates a vehicle door according to an exemplary embodiment of the present disclosure.
Figure 2:
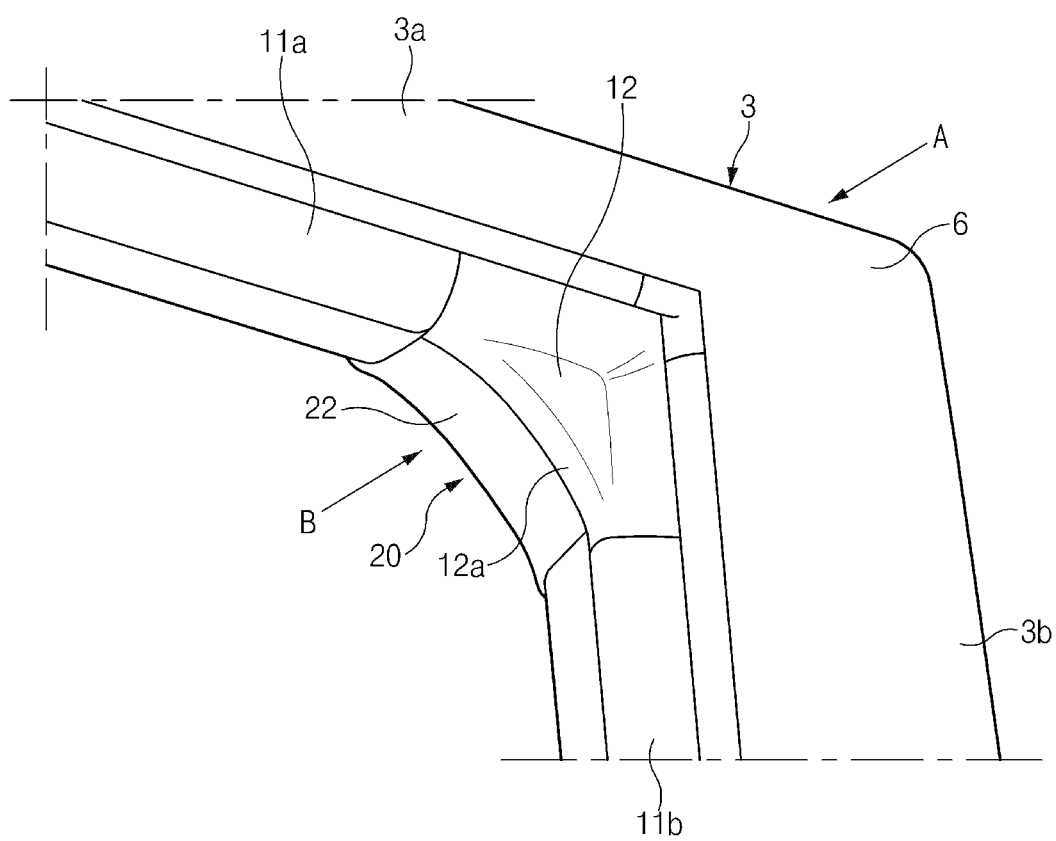
FIG. 2 illustrates a state in which an inner cover according to an exemplary embodiment of the present disclosure is mounted on a door frame and a door glass run.
Figure 3:
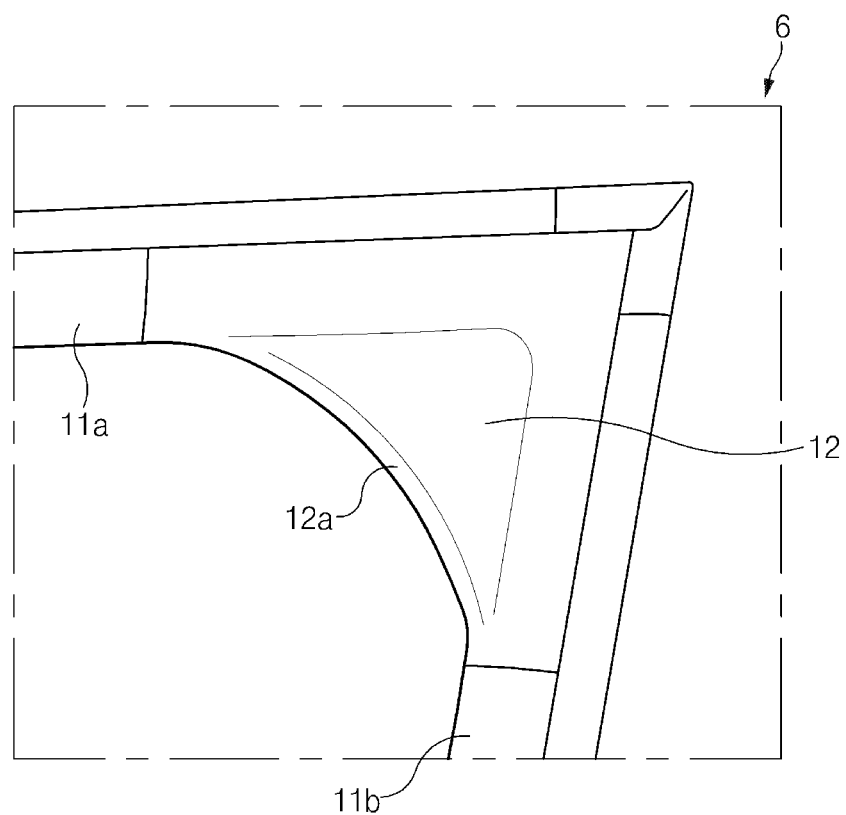
FIG. 3 illustrates a view in a direction of arrow A of FIG. 2.
Figure 4:
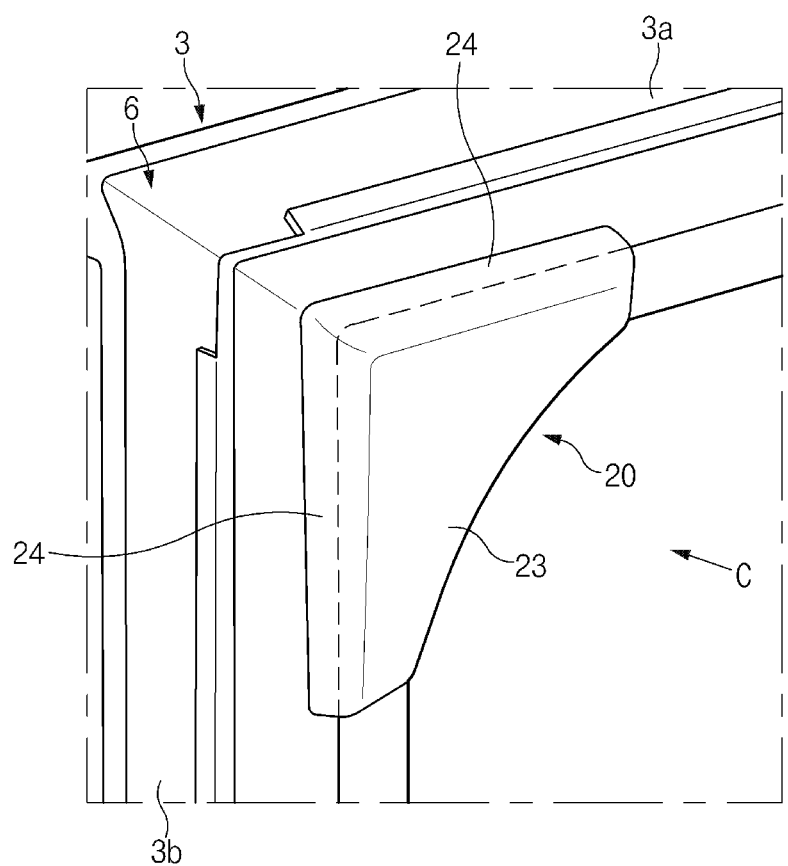
FIG. 4 illustrates a perspective view in a direction of arrow B of FIG. 2.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-of", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

In this description, the term "inner" refers to a direction toward the center of a window opening of a door frame, and the term "outer" refers to a direction away from the center of the window opening of the door frame. In addition, the term "inboard side" refers to a direction toward the interior space of a vehicle, and the term "outboard side" refers to a direction toward the outside of the vehicle.

Referring to FIG. 1, a vehicle door 1 may include a door panel 2, and a door frame 3 connected to the door panel 2. The door frame 3 may include a first extending portion 3a extending along a first direction, a second extending portion 3b extending along a second direction, a window opening 5 defined by the first extending portion 3a and the second extending portion, and a corner portion 6 connecting between the first extending portion 3a and the second extending portion 3b. The first extending portion 3a may extend along a longitudinal direction of a vehicle (e.g. oblique direction and horizontal direction), where the first extending portion 3a may contact a roof of the vehicle. The second extending portion 3b may extend along a height direction of the vehicle (e.g. vertical direction), where the second extending portion 3b may contact a pillar of the vehicle. In addition, the window opening 5 is opened and closed by a door glass 4.

A cover for a door frame according to an exemplary embodiment of the present disclosure, may comprise sealing member sealing between the door frame 3 and the door glass 1, and an inner cover 20 coupled to the sealing member. The sealing member may be a door glass run 10 attached to an inner periphery of the door frame 3. The door glass run 10 may seal between the door frame 3 and the door glass 1. The door frame 3 may have a corner portion 6, where the corner portion 6 may connect between the first extending portion 3a and the second extending portion 3b.

Referring to FIGS. 2 to 5, the door glass run 10 may extend along the door frame 3, and thus the door glass run 10 may be attached to the inner periphery of the door frame 3. The door glass run 10 may include a first extending portion 11a extending along the first extending portion 3a of the door frame 3, a second extending portion 11b extending along the second extending portion 3b of the door frame 3, and a corner portion 12 connecting between the first extending portion 11a and the second extending portion 11b. The corner portion 12 of the door glass run 10 may be attached to the corner portion 6 of the door frame 3, and an inner periphery 12a of the corner portion 12 of the door glass run 10 may have a curved shape. The inner cover 20 may be configured to cover inboard sides of the door frame 3 and the door glass run 10. The inner cover 20 may be configured to cover at least portion of the door glass run 10 and at least portion of the door frame 3. In one embodiment, the inner cover 20 may be integrally coupled or formed to the door glass run 10.

Referring to FIGS. 2 to 15, the inner cover 20 may have a shape corresponding to the corner portion 12 of the door glass run 10. The inner cover 20 may be a corner cover that is coupled to the corner portion 12 of the door glass run 10 to form a unitary one-piece structure, where the inner cover 20 covers the corner portion 6 of the door frame 3.

Figure 6:
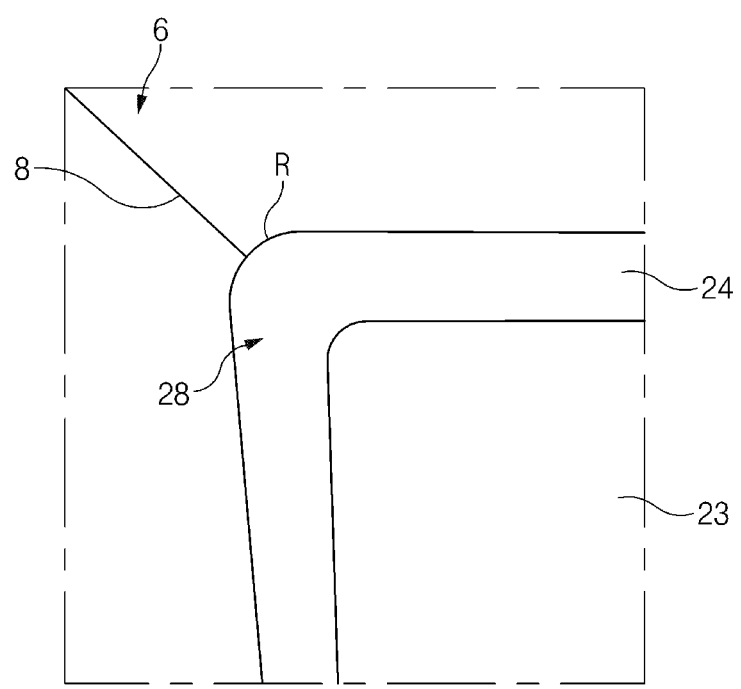
FIG. 6 illustrates an enlarged view of a portion indicated by arrow D of FIG. 5.
Figure 7:
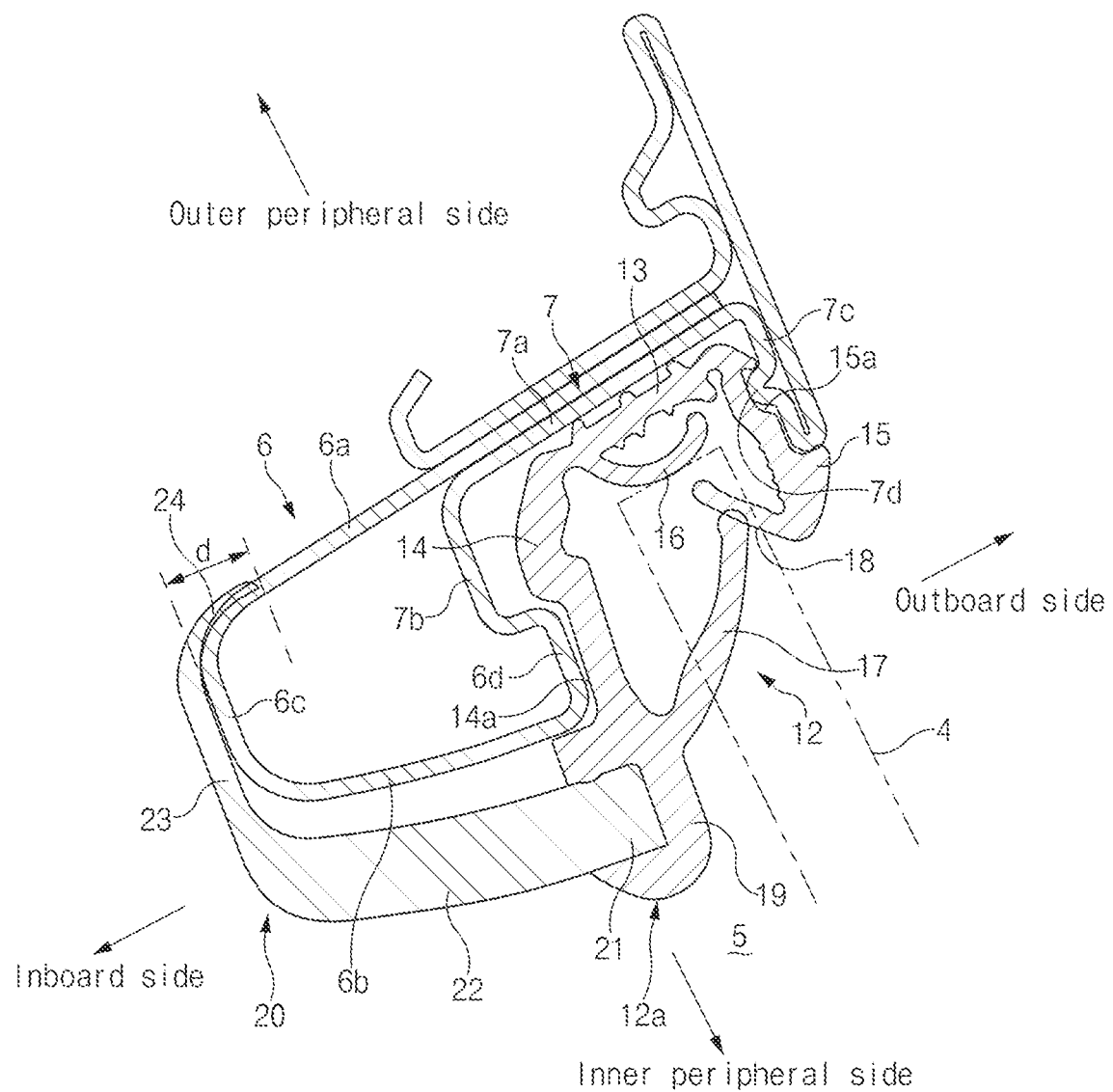
FIG. 7 illustrates a cross-sectional view taken along line E-E of FIG. 5.

Referring to FIG. 7, the corner portion 6 of the door frame 3 may include an outer peripheral wall 6a away from the center of the window opening 5, an inner peripheral wall 6b toward the center of the window opening 5, an inboard side wall 6c facing the interior space of the vehicle, and an outboard side wall 6d facing the outside of the vehicle. A channel 7 may be connected to the corner portion 6 of the door frame 3, and the channel 7 may receive the corner portion 12 of the door glass run 10. The channel 7 may include a base wall 7a attached to the outer peripheral wall 6a of the corner portion 6, an inboard side wall 7b facing the interior space of the vehicle, and an outboard side wall 7c facing the outside of the vehicle. The inboard side wall 7b of the channel 7 may be connected to the outboard side wall 6d of the corner portion 6, and the outboard side wall 6d of the corner portion 6 may protrude from the inboard side wall 7b of the channel 7 toward the outside of the vehicle. In an embodiment shown in FIGS. 2 to 15, the inner cover 20 may be configured to cover an inner periphery 6b of the corner portion 6 of the door frame 3, an inboard side wall 6c of the corner portion 6 of the door frame 3, and a portion of the outer periphery 6a of the corner portion 6 of the door frame 3.

Referring to FIG. 7, the corner portion 12 of the door glass run 10 may include a base wall 13, an inboard side wall 14, and an outboard side wall 15. A base seal lip 16 may extend from the base wall 13, an inboard seal lip 17 may extend from the inboard side wall 14, and an outboard seal lip 18 may extend from the outboard side wall 15. The base seal lip 16, the inboard seal lip 17, and the outboard seal lip 18 may seal the door glass 4.

Referring to FIG. 7, the inboard side wall 14 of the door glass run 10 may have a groove 14a, and when the corner portion 12 of the door glass run 10 is received in the channel 7, the outboard side wall 6d of the door frame 3 may be fitted into the groove 14a of the door glass run 10. A protrusion 7d may protrude from the outboard side wall 7c of the channel 7 toward the interior space of the vehicle, and the outboard side wall 15 of the door glass run 10 may have a groove 15a. When the corner portion 12 of the door glass run 10 is received in the channel 7, the protrusion 7d of the channel 7 of the door frame 3 may be fitted into the groove 15a of the door glass run 10. Thus, the corner portion 12 of the door glass run 10 may be received and fitted in the channel 7 of the door frame 3.

The inner cover 20 may be integrally formed with or molded with at least one corner portion 12 of the door glass run 10. The inner cover 20 may configured to cover a portion of the outer peripheral wall 6a of the corner portion 6 of the door frame 3, the inner peripheral wall 6b of the corner portion 6 of the door frame 3, and the inboard side wall 6c of the corner portion 6 of the door frame 3. The inner cover 20 and the corner portion 6 of the door frame 3 may have a corresponding C-shaped or D-shaped cross section.

A portion of the inner cover 20 may be embedded in the corner portion 12 of the door glass run 10 by insert molding so that the inner cover 20 and the door glass run 10 may form a unitary one-piece structure. The inner cover 20 and the door glass run 10 may be made of different materials. In particular, the inner cover 20 and the door glass run 10 may be made of different materials having high chemical affinity so that the inner cover 20 and the door glass run 10 may be chemically combined in the insert molding process. For example, the inner cover 20 may be made of a thermoplastic polymer such as polypropylene (PP), and the door glass run 10 may be made of a thermoplastic elastomer such as thermoplastic elastomer (TPE) and thermoplastic vulcanisate (TPV).

According to an exemplary embodiment, the inner cover 20 may include, as illustrated in FIG. 7, an embedded portion 21 which is embedded in the corner portion 12 of the door glass run 10, an extension wall 22 which extends from the embedded portion 21 toward the interior space of the vehicle, an inboard side wall 23 which is bent at a predetermined angle from the extension wall 22, and a clip portion 24 which extend from the inboard side wall 23 toward the outside of the vehicle.

The embedded portion 21 may be embedded in the inner periphery 12a of the corner portion 12 of the door glass run 10 by insert molding.

The corner portion 12 of the door glass run 10 may include an encapsulation 19 surrounding the embedded portion 21, and the encapsulation 19 may be formed on the inner periphery 12a of the corner portion 12 of the door glass run 10. The shape of the encapsulation 19 may be determined by an insert mold. The embedded portion 21 may be firmly embedded by the encapsulation 19 so that the inner cover 20 may be integrally coupled to the corner portion 12 of the door glass run 10.

Figure 9:
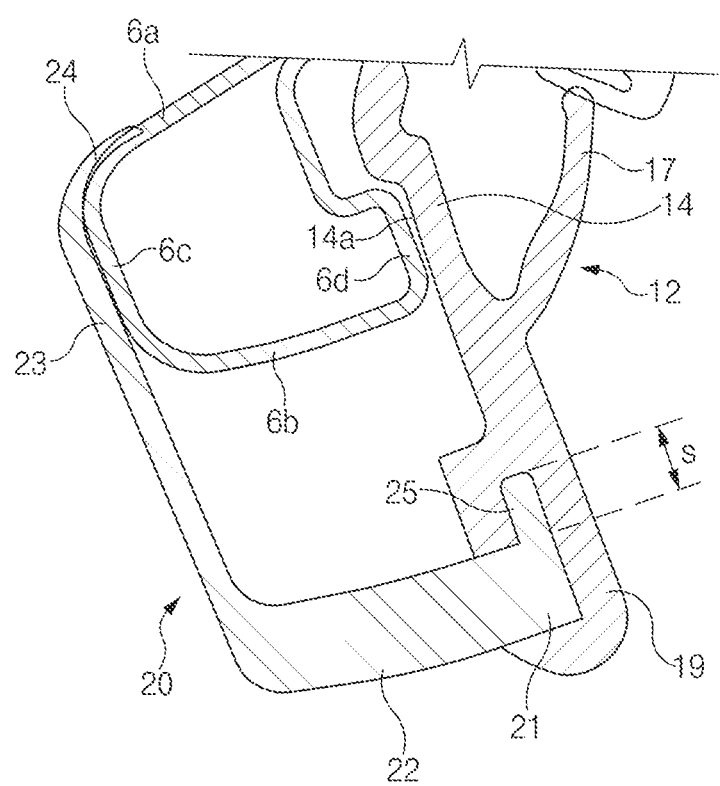
FIG. 9 illustrates a cross-sectional view taken along line F-F of FIG. 5.

According to an exemplary embodiment, a support protrusion 25 may extend by a predetermined length "s" from an end of the embedded portion 21, as illustrated in FIG. 9, and the axis of the support protrusion 25 may be substantially perpendicular to the axis of the embedded portion 21. In the insert molding process, the embedded portion 21 may be firmly coupled to the encapsulation 19 of the door glass run 10 by the support protrusion 25, and the support protrusion 25 may be a pivot point of the inner cover 20 when the inner cover 20 is mounted on the corner portion 6 of the door frame 3 so that the inner cover 20 may pivot on the support protrusion 25. In addition, resistance to deformation of the inner cover 20 may be increased by the support protrusion 25.

Figure 10:
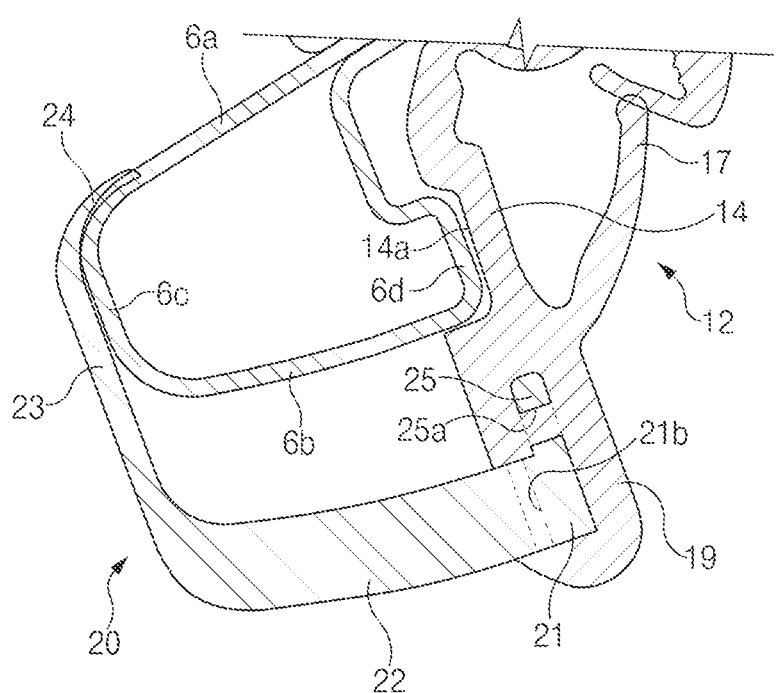
FIG. 10 illustrates a cross-sectional view taken along line G-G of FIG. 5.
Figure 12:
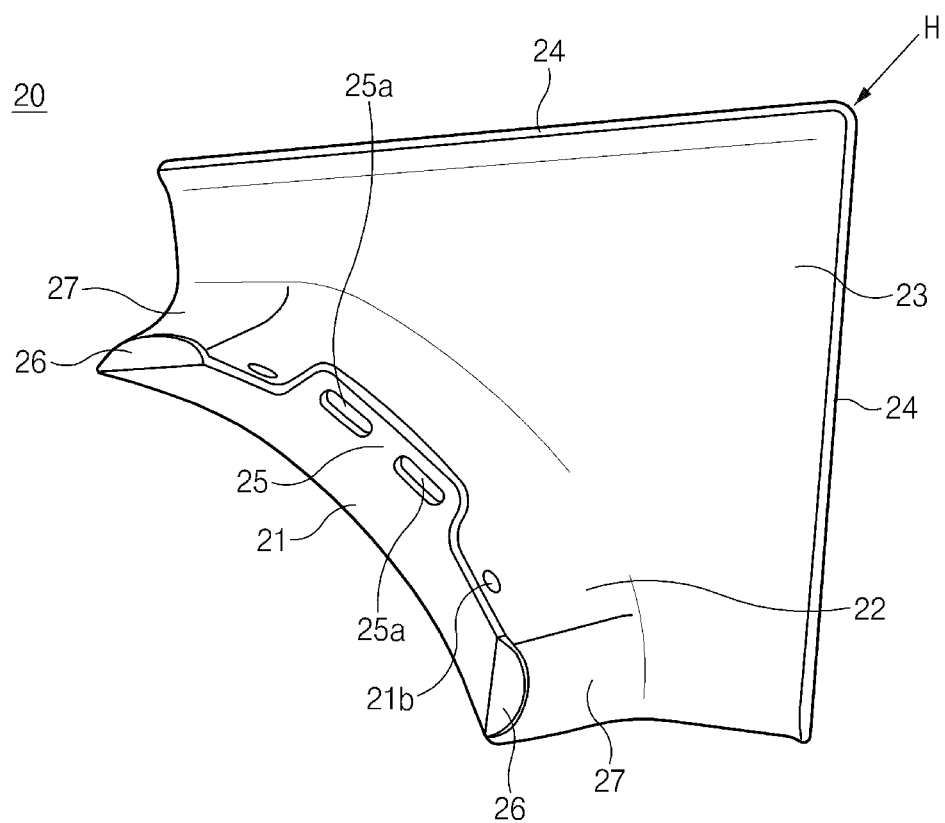
FIG. 12 illustrates a perspective view of an inner cover according to an exemplary embodiment of the present disclosure.

Referring to FIGS. 10 and 12, the support protrusion 25 may have at least one first through hole 25a. During the insert molding process, as a molten material forming the door glass run 10 fills the first through hole 25a of the support protrusion 25, the embedded portion 21 may be firmly coupled to the encapsulation 19 of the door glass run 10. FIG. 12 illustrates an example in which two first through holes 25a are formed in the support protrusion 25.

Figure 13:
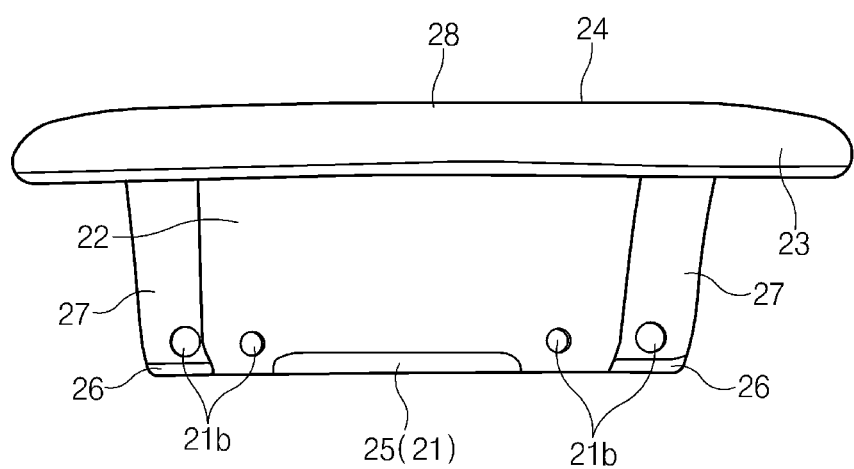
FIG. 13 illustrates a view in a direction of arrow H of FIG. 12.
Figure 14:
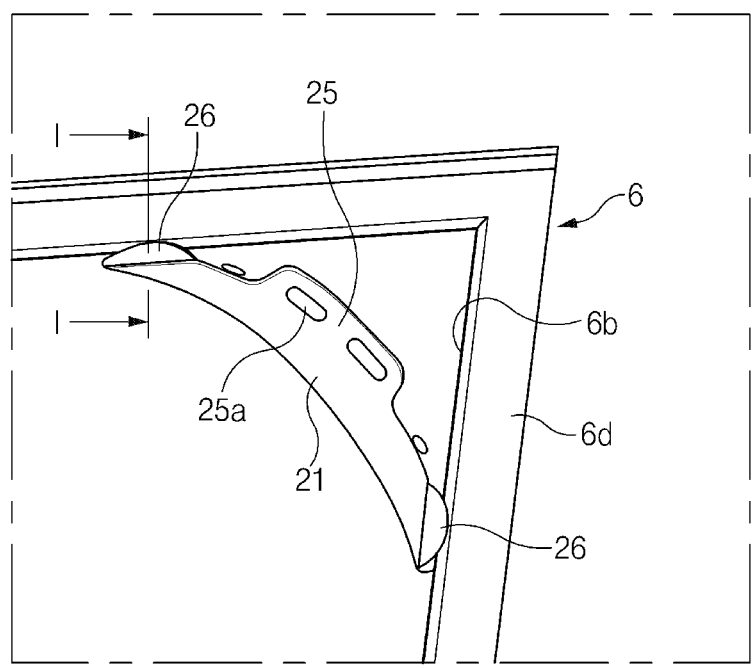
FIG. 14 illustrates a state in which an inner cover according to an exemplary embodiment of the present disclosure is assembled to a corner portion of a door frame.

As illustrated in FIGS. 10, 12, and 13, the embedded portion 21 may have at least one second through hole 21b. During the insert molding process, as a molten material forming the door glass run 10 fills the second through hole 21b of the embedded portion 21, the embedded portion 21 may be firmly coupled to the encapsulation 19 of the door glass run 10. FIG. 13 illustrates an example in which four second through holes 21b are formed in the embedded portion 21. Referring to FIG. 10, the axis of the second through hole 21b may be perpendicular to the axis of the first through hole 25a so that the embedded portion 21 may be more firmly coupled to the corner portion 12 of the door glass run 10.

Figure 5:
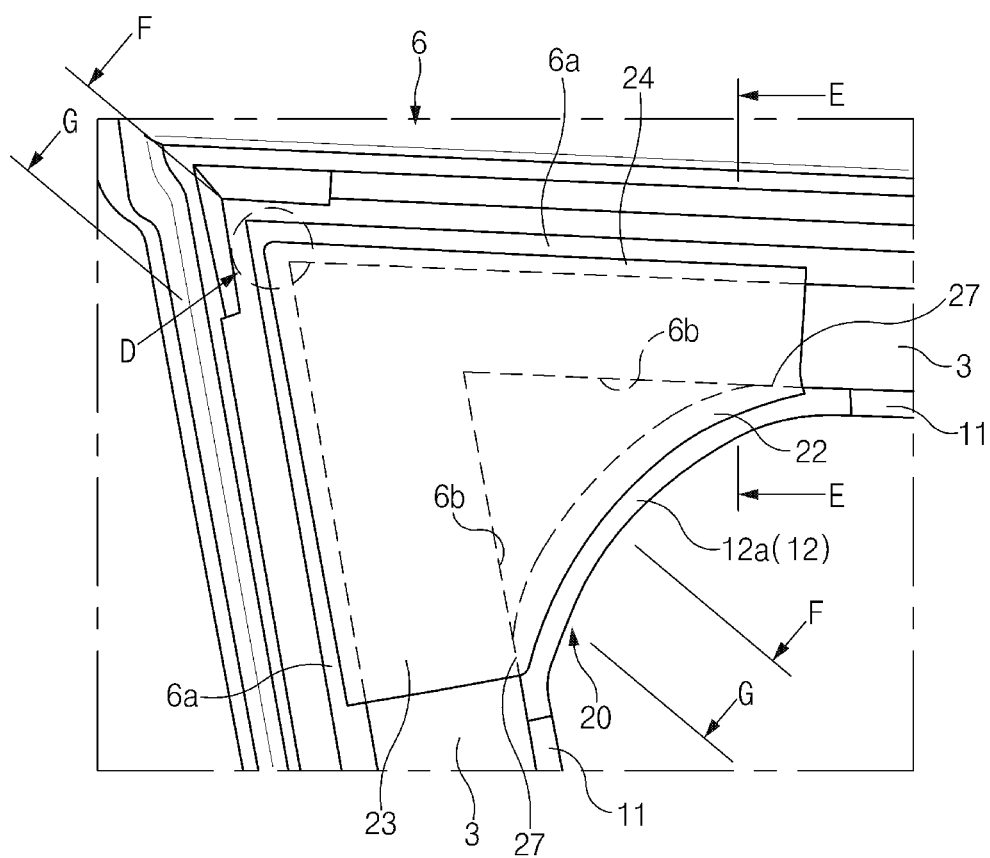
FIG. 5 illustrates a view in a direction of arrow C of FIG. 4.
Figure 11:
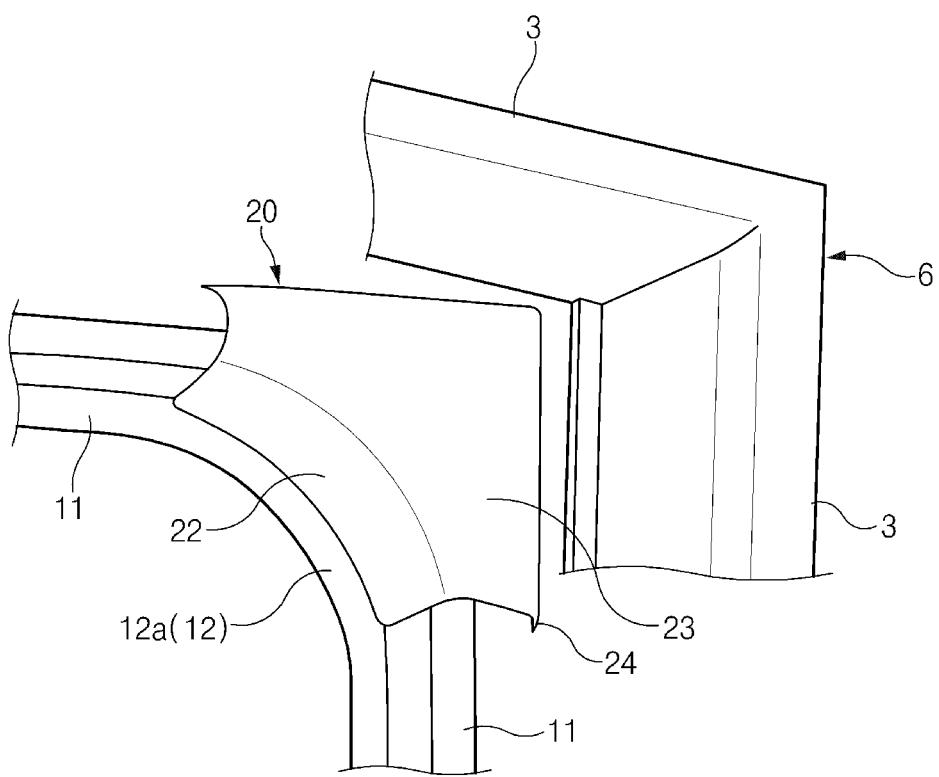
FIG. 11 illustrates an exploded perspective view of a state in which an inner cover according to an exemplary embodiment of the present disclosure is separated from a door frame and a door glass run.
Figure 15:
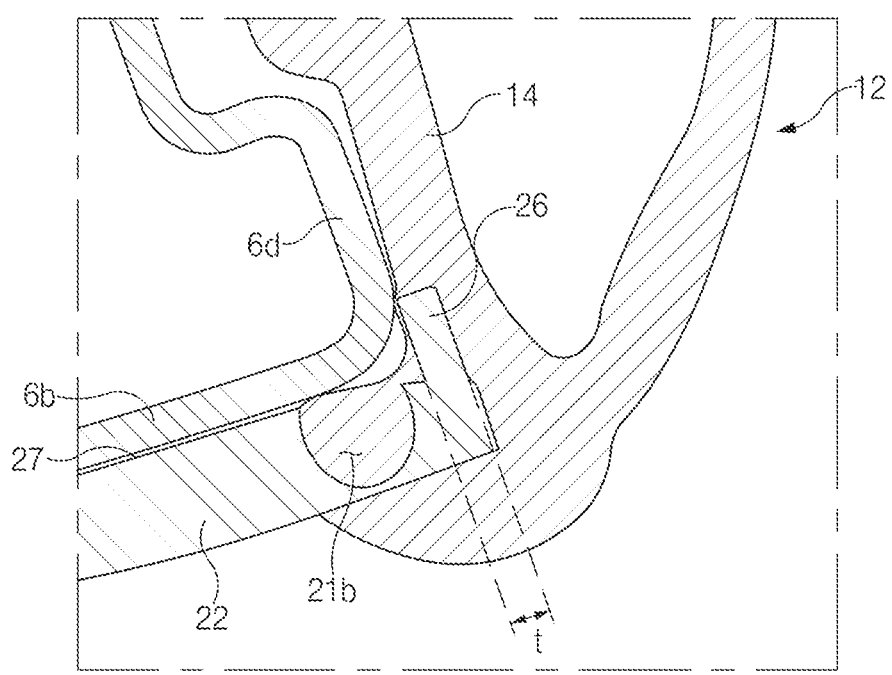
FIG. 15 illustrates a cross-sectional view taken along line I-I of FIG. 14.

As illustrated in FIGS. 11 and 12, the extension wall 22 may have a curved shape corresponding to that of the inner periphery 12a of the corner portion 12 of the door glass run 10. The extension wall 22 may be configured to cover the inner periphery 6b of the corner portion 6 of the door frame 3. As illustrated in FIG. 12, the extension wall 22 may have two flat surfaces 27 at both edges thereof, respectively. As illustrated in FIGS. 5 and 15, each flat surface 27 of the extension wall 22 may be brought into contact with the inner peripheral wall 6b of the corner portion 6 of the door frame 3 so that the inner cover 20 may be accurately matched to the door frame 3.

As illustrated in FIGS. 12 to 15, the inner cover 20 may further include two restricting ribs 26 formed on both edges of the embedded portion 21. Each restricting rib 26 may be provided at a free end of each flat surface 27 of the extension wall 22, and the axis of the restricting rib 26 may be substantially perpendicular to the axis of the flat surface 27. Each restricting rib 26 may not be embedded in the encapsulation 19 of the corner portion 12 of the door glass run 10. As illustrated in FIG. 15, as the flat surface 27 of the extension wall 22 is brought into contact with the inner peripheral wall 6b of the corner portion 6 of the door frame 3, the restricting rib 26 may be brought into contact with the outboard side wall 6d of the corner portion 6 of the door frame 3. As the restricting rib 26 is brought into contact with the outboard side wall 6d of the door frame 3, it may effectively restrict the inner cover 20 from moving in a lateral direction of the vehicle with respect to the door frame 3 after the inner cover 20 is attached to the door frame 3. Each restricting rib 26 may have a predetermined thickness "t" which gives sufficient stiffness in order that it may not be deformed when brought into contact with the outboard side wall 6d of the door frame 3.

Referring to FIG. 7, the inboard side wall 23 may be spaced apart from the corner portion 12 of the door glass run 10 toward the interior space of the vehicle. The inboard side wall 23 may have a first contact surface 23a contacting the inboard side wall 6c of the corner portion 6 of the door frame 3. The inboard side wall 23 may be configured to cover the inboard side wall 6c of the corner portion 6 of the door frame 3.

Figure 8:
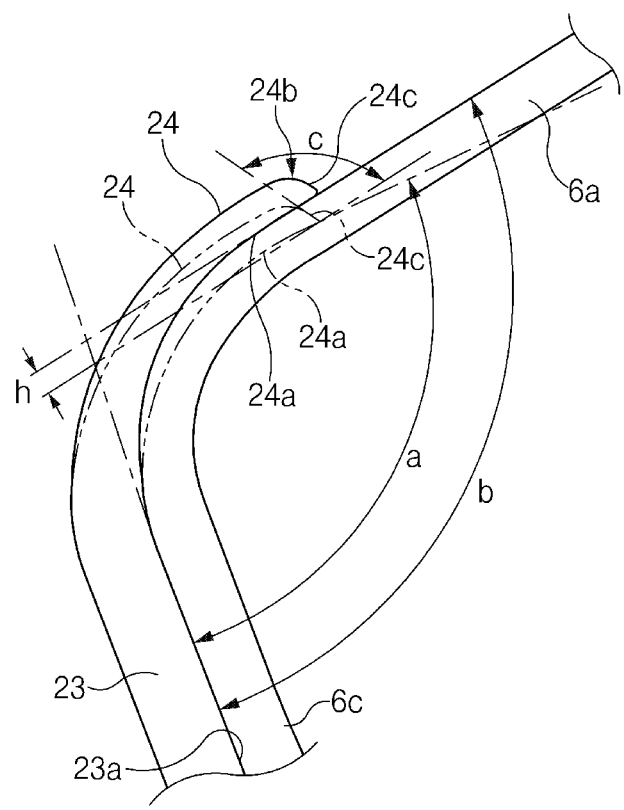
FIG. 8 illustrates an enlarged view of a clip portion of FIG. 7.

Referring to FIG. 8, the clip portion 24 may be angled from the inboard side wall 23, and the clip portion 24 may be curved. The clip portion 24 may be connected to be elastically deformed with respect to the inboard side wall 23, and the clip portion 24 may have a free end 24b. The clip portion 24 may have a second contact surface 24a contacting the outer peripheral wall 6a of the corner portion 6 of the door frame 3.

When the corner portion 12 of the door glass run 10 is fitted into the corner portion 6 of the door frame 3, the clip portion 24 may elastically cover at least a portion of the outer peripheral wall 6a of the corner portion 6 of the door frame 3 (see portion "d" in FIG. 7), and thus the clip portion 24 may be firmly coupled to the corner portion 6 of the door frame 3.

According to an exemplary embodiment, the thickness of the clip portion 24 may be gradually reduced from the edge of the inboard side wall 23 toward the free end 24b of the clip portion 24 so that the clip portion 24 may be elastically deformed more easily.

The second contact surface 24a of the clip portion 24 may be curved with at least one radius of curvature, and the second contact surface 24a of the clip portion 24 may be inclined at a first angle of inclination a with respect to the first contact surface 23a of the inboard side wall 23 (see a two-dot chain line indicated by reference numeral 24 in FIG. 8). That is, the first angle of inclination "a" may be an angle between the first contact surface 23a of the inboard side wall 23 and the second contact surface 24a of the clip portion 24. In particular, the first angle of inclination "a" may be an angle of intersection between the first contact surface 23a of the inboard side wall 23 and a tangent line at an end point of the second contact surface 24a.

The outer peripheral wall 6a of the corner portion 6 of the door frame 3 may be inclined at a second angle of inclination "b" with respect to the first contact surface 23a of the inboard side wall 23. That is, the second angle of inclination "b" may be an angle between the first contact surface 23a of the inboard side wall 23 and the outer peripheral wall 6a of the corner portion 6 of the door frame 3.

According to an exemplary embodiment, the first angle of inclination "a" may be less than the second angle of inclination "b," and the clip portion 24 indicated by the two-dot chain line in FIG. 8 may interfere with the outer peripheral wall 6a of the door frame 3 by a predetermined thickness "h." Here, the clip portion 24 indicated by the two-dot chain line in FIG. 8 may indicate a state before the inner cover 20 is assembled to the corner portion 6 of the door frame 3, and the clip portion 24 indicated by a solid line in FIG. 8 may indicate a state in which the inner cover 20 is assembled to the corner portion 6 of the door frame 3.

In particular, as the clip portion 24 indicated by the two-dot chain line in FIG. 8 is inclined at an angle less than that of the outer peripheral wall 6a of the corner portion 6 of the door frame 3, the clip portion 24 indicated by the solid line in FIG. 8 may be forcedly fitted (that is, tight fit) to the outer peripheral wall 6a of the corner portion 6 of the door frame 3.

In addition, as the first angle of inclination "a" is less than the second angle of inclination "b," the clip portion 24 may be accurately matched to the outer peripheral wall 6a of the corner portion 6 of the door frame 3 even if the manufacturing tolerance of the clip portion 24 and the manufacturing tolerance of the outer peripheral wall 6a of the corner portion 6 of the door frame 3 occur, and thus there may be no gap between the clip portion 24 and the outer peripheral wall 6a of the corner portion 6.

The clip portion 24 may further include a chamfer 24c formed at the free end 24b, and the chamfer 24c may be inclined at a third angle of inclination "c" with respect to the outer peripheral wall 6a of the corner portion 6 of the door frame 3. For example, the third angle of inclination "c" may be an obtuse angle of about 130°. As the chamfer 24c having the third angle of inclination "c" is formed at the free end 24b of the clip portion 24, the free end 24b of the clip portion 24 may be prevented from coming off the outer peripheral wall 6a of the corner portion 6 of the door frame 3, thereby avoiding the creation of a step between the free end 24b of the clip portion 24 and the outer peripheral wall 6a of the corner portion 6 of the door frame 3.

The corner portion 6 of the door frame 3 may be formed by joining two members by butt welding. A vertex 8 of the corner portion 6 of the door frame 3 may have a weld bead rounded to a predetermined radius by butt welding. As illustrated in FIG. 6, the inner cover 20 may have a rounded portion R formed at a vertex 28 of the clip portion 24, and the rounded portion R may cover the rounded weld bead of the corner portion 6 of the door frame 3. Thus, the inner cover 20 may be accurately matched to the corner portion 6 of the door frame 3.

Figure 16:
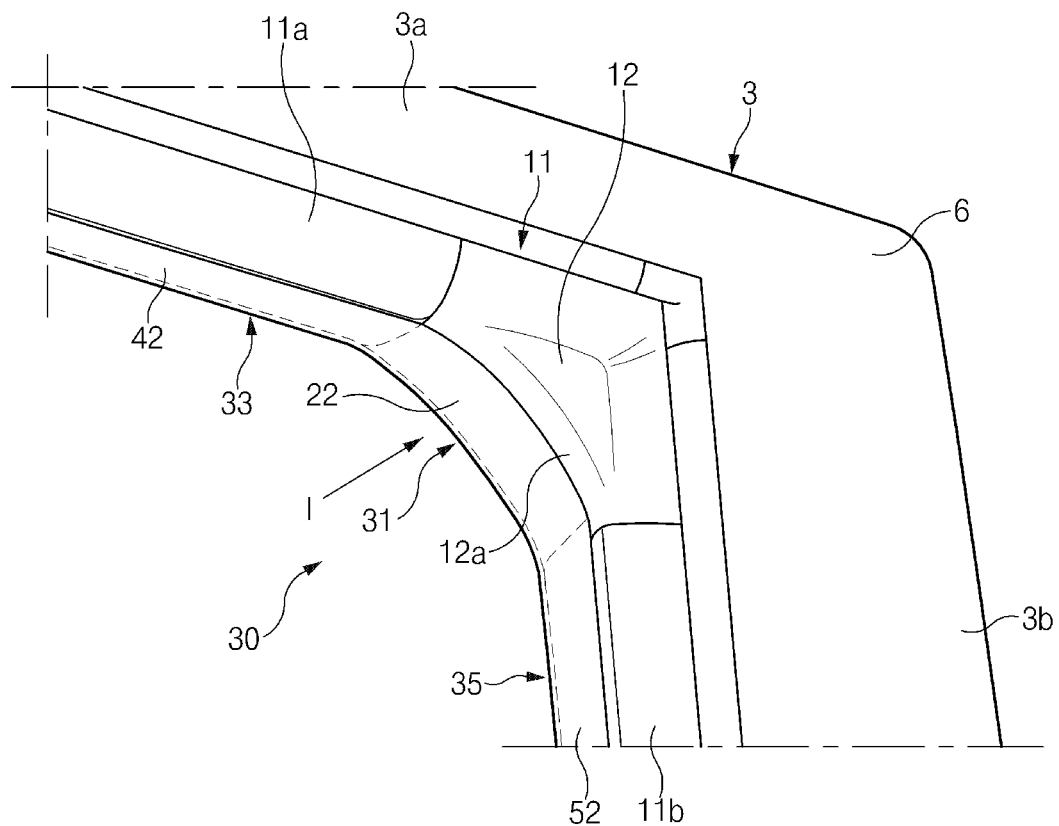
FIG. 16 illustrates a state in which an inner cover according to another exemplary embodiment of the present disclosure is mounted on a door frame and a door glass run.
Figure 17:
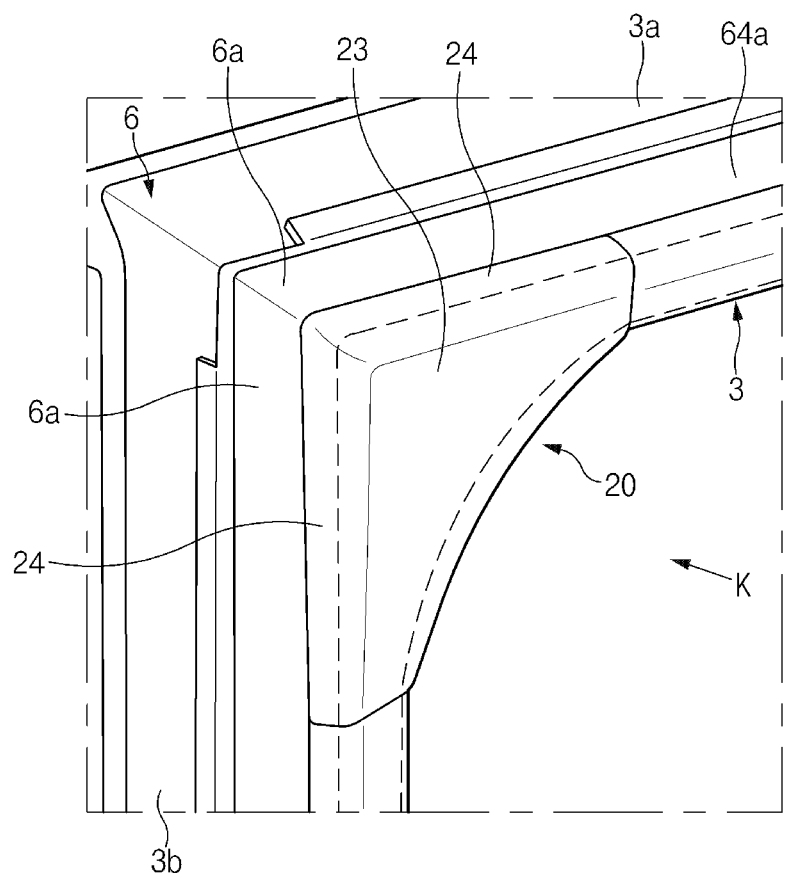
FIG. 17 illustrates a view in a direction of arrow J of FIG. 16.
Figure 18:
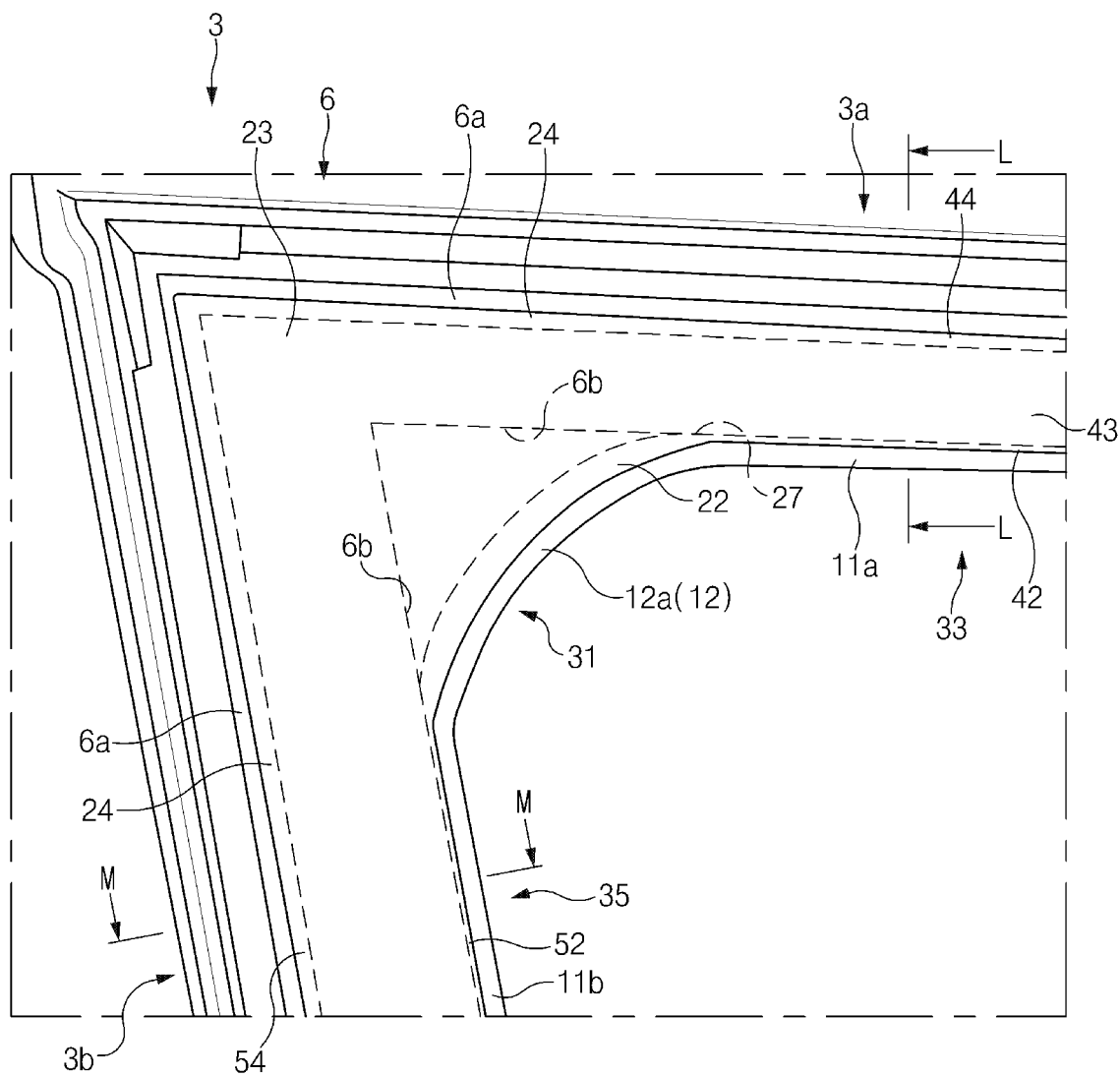
FIG. 18 illustrates a view in a direction of arrow K of FIG. 17.

FIGS. 16 to 21 illustrate an inner cover 30 according to another exemplary embodiment of the present disclosure. The inner cover 30 according to another exemplary embodiment of the present disclosure, as illustrated in FIGS. 16 and 17, may be configured to cover the first extending portion 3a of the door frame 3, the second extending portion 3b of the door frame 3, and the corner portion 6 of the door frame 3.

Referring to FIGS. 16 and 17, the inner cover 30 may include a corner cover portion 31 covering the corner portion 6 of the door frame 3, a first extending cover portion 33 covering the first extending portion 3a of the door frame 3, and a second extending cover portion 35 covering the second extending portion 3b of the door frame 3.

The corner cover portion 31 may be embedded in the corner portion 12 of the door glass run 10 by insert molding, the first extending cover portion 33 may be embedded in the first extending portion 11a of the door glass run 10 by insert molding, and the second extending cover portion 35 may be embedded in the second extending portion 11b of the door glass run 10 by insert molding. Accordingly, the inner cover 30 and the door glass run 10 may form a unitary one-piece structure.

The inner cover 30 and the door glass run 10 may be made of different materials. In particular, the inner cover 30 and the door glass run 10 may be made of different materials having high chemical affinity so that the inner cover 30 and the door glass run 10 may be chemically combined in the insert molding process. For example, the inner cover 30 may be made of a thermoplastic polymer such as polypropylene (PP), and the door glass run 10 may be made of a thermoplastic elastomer such as thermoplastic elastomer (TPE) and thermoplastic vulcanisate (TPV).

Figure 23:
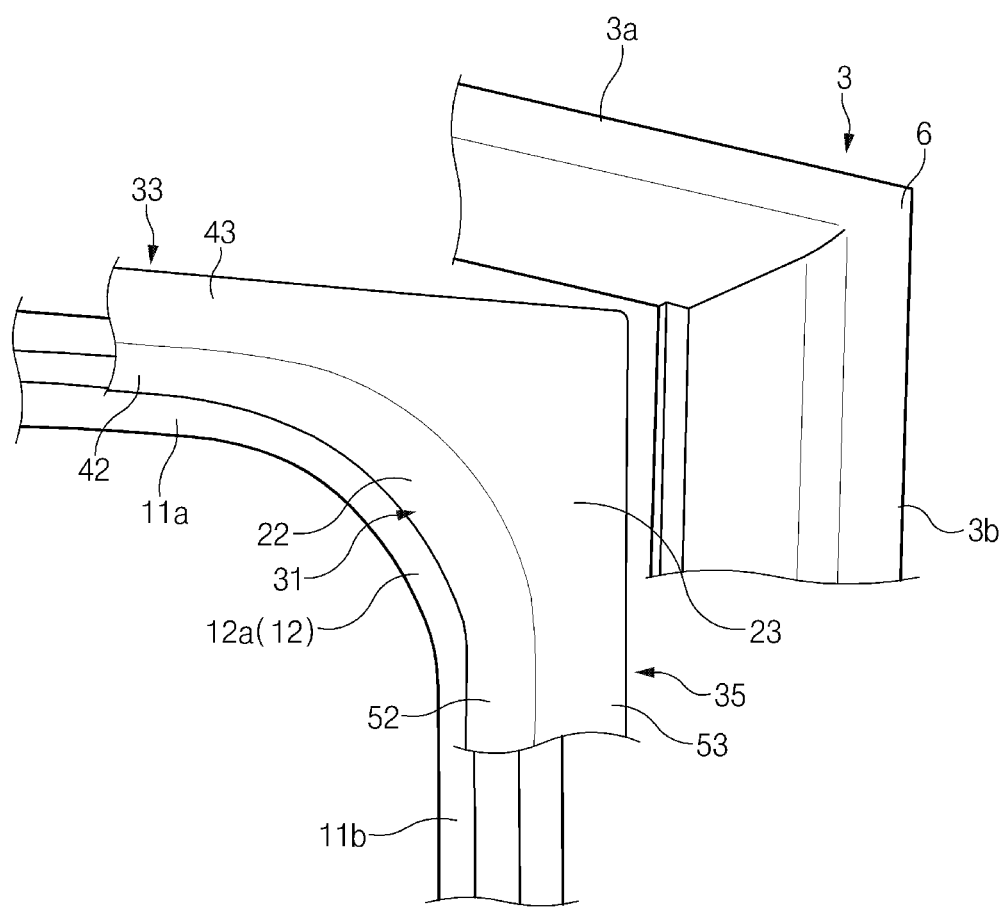
FIG. 23 illustrates an exploded perspective view of a state in which an inner cover according to another exemplary embodiment of the present disclosure is separated from a door frame and a door glass run.
Figure 24:
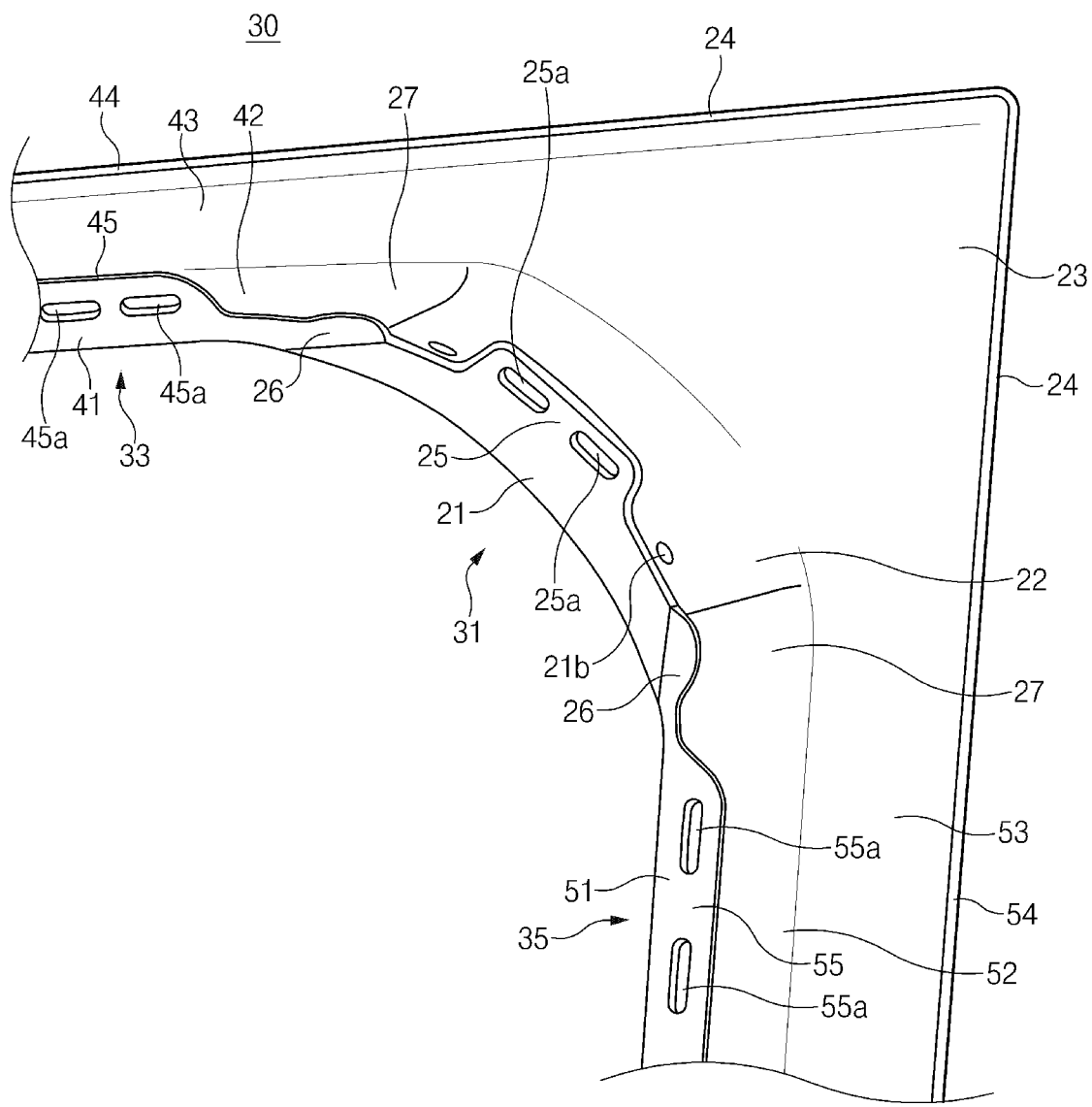
FIG. 24 illustrates a perspective view of an inner cover according to another exemplary embodiment of the present disclosure.

Referring to FIGS. 23 and 24, a structure or configuration of the corner cover portion 31 is the same or similar to a structure or configuration of the inner cover 20 as shown in FIGS. 2 to 15, and thus various elements (such as the embedded portion 21, the extension wall 22, the inboard side wall 23, the clip portion 24, the support protrusion 25, the first through hole 25a, the second through hole 21b, restricting ribs 26, and flat surface 27) forming the corner cover portion 31 are designated by the same reference numbers.

Referring to FIGS. 16-18 and 23, the first extending cover portion 33 may extend along the first extending portion 3a of the door frame 3 and the first extending portion 11a of the door glass run 10.

Figure 19:
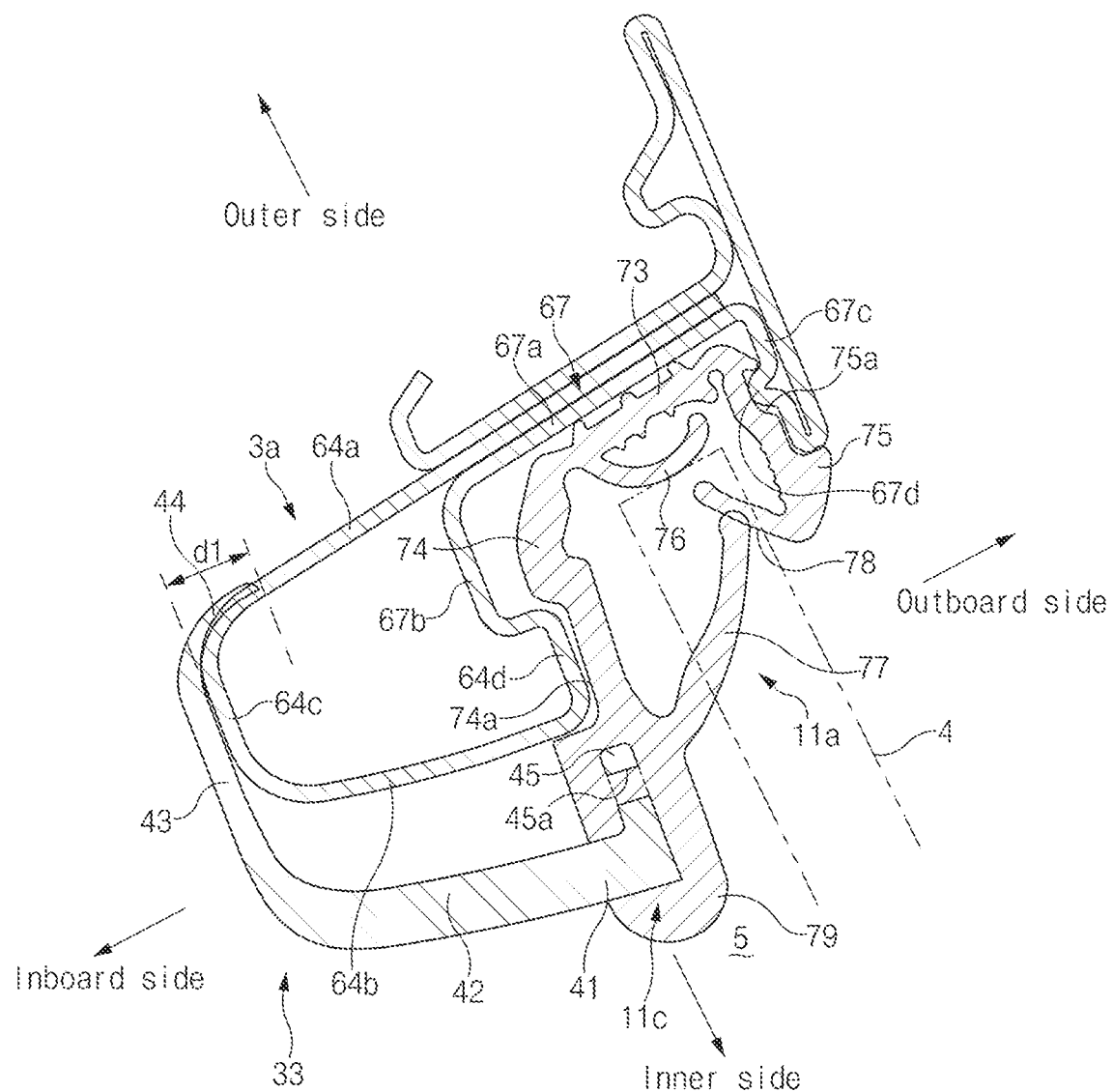
FIG. 19 illustrates a cross-sectional view taken along line L-L of FIG. 18.

Referring to FIG. 19, the first extending portion 3a of the door frame 3 may include an outer peripheral wall 64a away from the center of the window opening 5, an inner peripheral wall 64b toward the center of the window opening 5, an inboard side wall 64c facing the interior space of the vehicle, and an outboard side wall 64d facing the outside of the vehicle. A channel 67 may be connected to the first extending portion 3a of the door frame 3, and the channel 67 may be configured to receive the first extending portion 11a of the door glass run 10. The channel 67 may include a base wall 67a attached to the outer peripheral wall 64a of the first extending portion 3a, an inboard side wall 67b facing the interior space of the vehicle, and an outboard side wall 67c facing the outside of the vehicle. The inboard side wall 67b of the channel 67 may be connected to the outboard side wall 64d of the first extending portion 3a, and the outboard side wall 64d of the first extending portion 3a may protrude from the inboard side wall 67b of the channel 67 toward the outside of the vehicle.

Referring to FIG. 19, the first extending portion 11a of the door glass run 10 may include a base wall 73, an inboard side wall 74, and an outboard side wall 75. A base seal lip 76 may extend from the base wall 73, an inboard seal lip 77 may extend from the inboard side wall 74, and an outboard seal lip 78 may extend from the outboard side wall 75. The base seal lip 76, the inboard seal lip 77, and the outboard seal lip 78 may seal the door glass 4.

Referring to FIG. 19, the inboard side wall 74 of the first extending portion 11a of the door glass run 10 may have a groove 74a, and when the first extending portion 11a of the door glass run 10 is received in the channel 67, the outboard side wall 64d of the first extending portion 3a of the door frame 3 may be fitted into the groove 74a of the door glass run 10. A protrusion 67d may protrude from the outboard side wall 67c of the channel 67 toward the interior space of the vehicle, and the outboard side wall 75 of the first extending portion 11a of the door glass run 10 may have a groove 75a. When the first extending portion 11a of the door glass run 10 is received in the channel 67 of the first extending portion 3a of the door frame 3, the protrusion 67d of the channel 67 may be fitted into the groove 15a of the first extending portion 11a of the door glass run 10. Thus, the first extending portion 11a of the door glass run 10 may be received and fitted in the channel 67 of the first extending portion 3a of the door frame 3.

The first extending cover portion 33 of the inner cover 30 may be integrally formed with or molded with the first extending portion 11a of the door glass run 10. Referring to FIGS. 16 to 21, the first extending cover portion 33 of the inner cover 30 may be configured to cover a portion of the outer peripheral wall 64a of the first extending portion 3a of the door frame 3, the inner peripheral wall 64b of the first extending portion 3a of the door frame 3, and the inboard side wall 64c of the first extending portion 3a of the door frame 3. The first extending cover portion 33 of inner cover 30 and the first extending portion 11a of the door frame 3 may have a corresponding C-shaped or D-shaped cross section.

The first extending cover portion 33 may include, as illustrated in FIGS. 19, 20, 43, and 44, an embedded portion 41 which is embedded in the first extending portion 11a of the door glass run 10, an extension wall 42 which extends from the embedded portion 41 toward the interior space of the vehicle, an inboard side wall 43 which is bent at a predetermined angle from the extension wall 42, and a clip portion 44 which extend from the inboard side wall 43 toward the outside of the vehicle.

The embedded portion 41 may extend along the first extending portion 11a of the door glass run 10 from the embedded portion 41 of the corner cover portion 31. The embedded portion 41 may be embedded in the inner periphery 11c of the first extending portion 11a of the door glass run 10 by insert molding.

The first extending portion 11a of the door glass run 10 may include an encapsulation 79 surrounding the embedded portion 41, and the encapsulation 79 may be formed on the inner periphery 11c of the first extending portion 11a of the door glass run 10. The shape of the encapsulation 79 may be determined by an insert mold. The embedded portion 41 may be firmly embedded by the encapsulation 79 so that the first extending cover portion 33 may be integrally coupled to the first extending portion 11a of the door glass run 10.

According to an exemplary embodiment, a support protrusion 45 may extend by a predetermined length "s" from an end of the embedded portion 41 as illustrated in FIG. 19, and the axis of the support protrusion 45 may be substantially perpendicular to the axis of the embedded portion 41. The support protrusion 45, as illustrated in FIG. 24, may extend along the first extending cover portion 33. In the insert molding process, the embedded portion 41 may be firmly coupled to the encapsulation 79 of the door glass run 10 by the support protrusion 45, and the support protrusion 45 may be a pivot point of the inner cover 30 when the first extending cover portion 33 of the inner cover 30 is mounted on the first extending portion 3a of the door frame 3 so that the first extending cover portion 33 of the inner cover 30 may pivot on the support protrusion 45. In addition, resistance to deformation of the first extending cover portion 33 of the inner cover 30 may be increased by the support protrusion 45.

Referring to FIGS. 19 and 24, the support protrusion 45 may have at least one first through hole 45a. During the insert molding process, as a molten material forming the door glass run 10 fills the first through hole 45a of the support protrusion 45, the embedded portion 41 may be firmly coupled to the encapsulation 79 of the door glass run 10.

As illustrated in FIG. 19, the embedded portion 41 may have at least one second through hole 41b. During the insert molding process, as a molten material forming the door glass run 10 fills the second through hole 41b of the embedded portion 41, the embedded portion 41 may be firmly coupled to the encapsulation 79 of the door glass run 10. The axis of the second through hole 41b may be perpendicular to the axis of the first through hole 45a so that the embedded portion 41 may be more firmly coupled to the first extending portion 11a of the door glass run 10.

As illustrated in FIG. 19, the extension wall 42 may be configured to cover the inner periphery 64b of the first extending portion 3a of the door frame 3.

Referring to FIG. 19, the inboard side wall 43 may be spaced apart from the first extending portion 11a of the door glass run 10 toward the interior space of the vehicle. The inboard side wall 43 may have a first contact surface 43a contacting the inboard side wall 64c of the first extending 3a of the door frame 3. The inboard side wall 43 may be configured to cover the inboard side wall 64c of the first extending portion 3a of the door frame 3.

Figure 20:
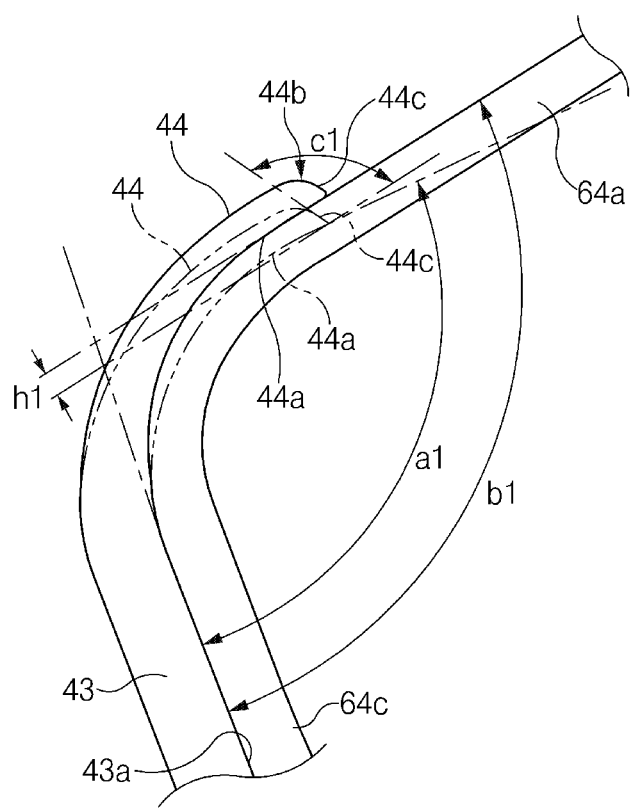
FIG. 20 illustrates an enlarged view of a clip portion of FIG. 19.

Referring to FIGS. 19 and 20, the clip portion 44 may be angled from the inboard side wall 43, and the clip portion 44 may be curved. The clip portion 44 may be connected to be elastically deformed with respect to the inboard side wall 43, and the clip portion 44 may have a free end 44b. The clip portion 44 may have a second contact surface 44a contacting the outer peripheral wall 64a of the first extending portion 3a of the door frame 3.

When the first extending portion 11a of the door glass run 10 is fitted into the first extending portion 3a of the door frame 3, the clip portion 44 may elastically cover at least a portion of the outer peripheral wall 64a of the first extending portion 3a of the door frame 3 (see portion "d1" in FIG. 19), and thus the clip portion 44 may be firmly coupled to the first extending portion 3a of the door frame 3.

According to another exemplary embodiment, the thickness of the clip portion 44 may be gradually reduced from the edge of the inboard side wall 43 toward the free end 44b of the clip portion 44 so that the clip portion 44 may be elastically deformed more easily.

The second contact surface 44a of the clip portion 44 may be curved with at least one radius of curvature, and the second contact surface 44a of the clip portion 44 may be inclined at a first angle of inclination a1 with respect to the first contact surface 43a of the inboard side wall 43 (see a two-dot chain line indicated by reference numeral 44 in FIG. 20). That is, the first angle of inclination a1 may be an angle between the first contact surface 43a of the inboard side wall 43 and the second contact surface 44a of the clip portion 44. In particular, the first angle of inclination a1 may be an angle of intersection between the first contact surface 43a of the inboard side wall 43 and a tangent line at an end point of the second contact surface 44a.

The outer peripheral wall 64a of the first extending portion 3a of the door frame 3 may be inclined at a second angle of inclination b1 with respect to the first contact surface 43a of the inboard side wall 43. That is, the second angle of inclination b1 may be an angle between the first contact surface 43a of the inboard side wall 43 and the outer peripheral wall 64a of the first extending portion 3a of the door frame 3.

According to another exemplary embodiment, the first angle of inclination a1 may be less than the second angle of inclination b1, and the clip portion 44 indicated by the two-dot chain line in FIG. 20 may interfere with the outer peripheral wall 64a of the door frame 3 by a predetermined thickness h1. Here, the clip portion 44 indicated by the two-dot chain line in FIG. 20 may indicate a state before the first extending cover portion 33 of the inner cover 30 is assembled to the first extending portion 3a of the door frame 3, and the clip portion 44 indicated by a solid line in FIG. 20 may indicate a state in which the first extending cover portion 33 of the inner cover 30 is assembled to the first extending portion 3a of the door frame 3.

In particular, as the clip portion 44 indicated by the two-dot chain line in FIG. 20 is inclined at an angle less than that of the outer peripheral wall 64a of the first extending portion 3a of the door frame 3 (a1<b1), the clip portion 44 indicated by the solid line in FIG. 20 may be forcedly fitted (that is, tight fit) to the outer peripheral wall 64a of the first extending portion 3a of the door frame 3.

In addition, as the first angle of inclination a1 is less than the second angle of inclination b1, the clip portion 44 may be accurately matched to the outer peripheral wall 64a of the first extending portion 3a of the door frame 3 even if the manufacturing tolerance of the clip portion 44 and the manufacturing tolerance of the outer peripheral wall 64a of the first extending portion 3a of the door frame 3 occur, and thus there may be no gap between the clip portion 44 and the outer peripheral wall 64a of the first extending portion 3a.

The clip portion 44 may further include a chamfer 44c formed at the free end 44b, and the chamfer 44c may be inclined at a third angle of inclination c1 with respect to the outer peripheral wall 64a of the first extending portion 3a of the door frame 3. For example, the third angle of inclination c1 may be an obtuse angle of about 130°. As the chamfer 44c having the third angle of inclination c1 is formed at the free end 44b of the clip portion 44, the free end 44b of the clip portion 44 may be prevented from coming off the outer peripheral wall 64a of the first extending portion 3a of the door frame 3, thereby avoiding the creation of a step between the free end 44b of the clip portion 44 and the outer peripheral wall 64a of the first extending portion 3a of the door frame 3.

Referring to FIGS. 16, 17, 18, and 23, the second extending cover portion 35 may extend along the second extending portion 3b of the door frame 3 and the second extending portion 11b of the door glass run 10.

Figure 21:
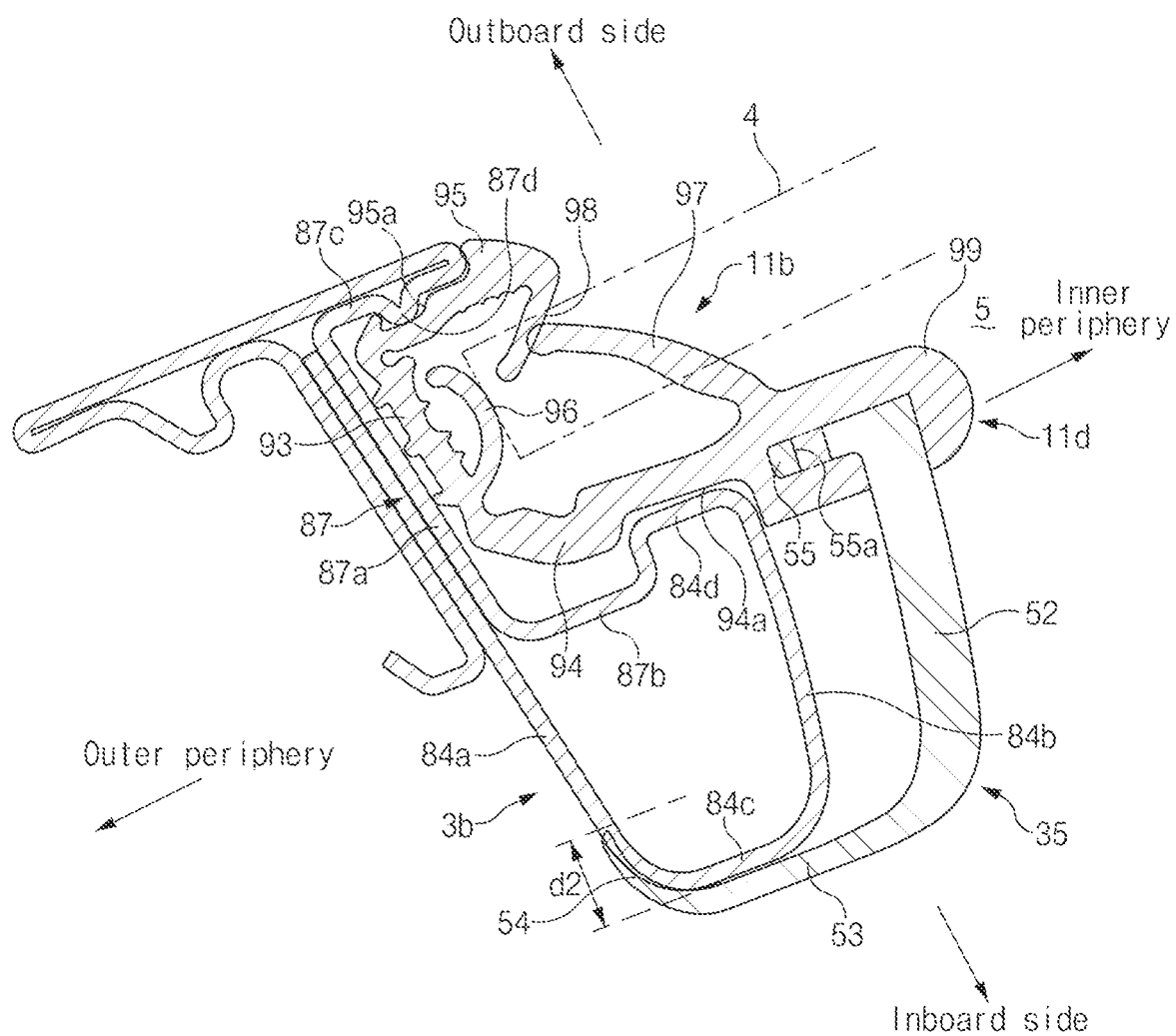
FIG. 21 illustrates a cross-sectional view taken along line M-M of FIG. 18.

Referring to FIG. 21, the second extending portion 3b of the door frame 3 may include an outer peripheral wall 84a away from the center of the window opening 5, an inner peripheral wall 84b toward the center of the window opening 5, an inboard side wall 84c facing the interior space of the vehicle, and an outboard side wall 84d facing the outside of the vehicle. A channel 87 may be connected to the second extending portion 3b of the door frame 3, and the channel 87 may be configured to receive the second extending portion 11b of the door glass run 10. The channel 87 may include a base wall 87a attached to the outer peripheral wall 84a of the second extending portion 3b, an inboard side wall 87b facing the interior space of the vehicle, and an outboard side wall 87c facing the outside of the vehicle. The inboard side wall 87b of the channel 87 may be connected to the outboard side wall 84d of the second extending portion 3b, and the outboard side wall 84d of the second extending portion 3b may protrude from the inboard side wall 87b of the channel 87 toward the outside of the vehicle.

Referring to FIG. 21, the second extending portion 11b of the door glass run 10 may include a base wall 93, an inboard side wall 94, and an outboard side wall 95. A base seal lip 96 may extend from the base wall 93, an inboard seal lip 97 may extend from the inboard side wall 94, and an outboard seal lip 98 may extend from the outboard side wall 95. The base seal lip 96, the inboard seal lip 97, and the outboard seal lip 98 may seal the door glass 4.

Referring to FIG. 21, the inboard side wall 94 of the second extending portion 11b of the door glass run 10 may have a groove 94a, and when the second extending portion 11b of the door glass run 10 is received in the channel 87, the outboard side wall 84d of the second extending portion 3b of the door frame 3 may be fitted into the groove 94a of the door glass run 10. A protrusion 87d may protrude from the outboard side wall 87c of the channel 87 toward the interior space of the vehicle, and the outboard side wall 95 of the second extending portion 11b of the door glass run 10 may have a groove 95a. When the second extending portion 11b of the door glass run 10 is received in the channel 87 of the second extending portion 3b of the door frame 3, the protrusion 87d of the channel 87 may be fitted into the groove 15a of the second extending portion 11b of the door glass run 10. Thus, the second extending portion 11b of the door glass run 10 may be received and fitted in the channel 87 of the second extending portion 3b of the door frame 3.

The second extending cover portion 35 of the inner cover 30 may be integrally formed with or molded with the second extending portion 11b of the door glass run 10. Referring to FIGS. 16 to 21, the second extending cover portion 35 of the inner cover 30 may be configured to cover a portion of the outer peripheral wall 84a of the second extending portion 3b of the door frame 3, the inner peripheral wall 84b of the second extending portion 3b of the door frame 3, and the inboard side wall 84c of the second extending portion 3b of the door frame 3. The second extending cover portion 35 of inner cover 30 and the second extending portion 11b of the door frame 3 may have a corresponding C-shaped or D-shaped cross section.

The second extending cover portion 35 may include, as illustrated in FIGS. 21-24, an embedded portion 51 which is embedded in the second extending portion 11b of the door glass run 10, an extension wall 52 which extends from the embedded portion 51 toward the interior space of the vehicle, an inboard side wall 53 which is bent at a predetermined angle from the extension wall 52, and a clip portion 54 which extends from the inboard side wall 53 toward the outside of the vehicle.

The embedded portion 51 may extend along the second extending portion 11b of the door glass run 10 from the embedded portion 51 of the corner cover portion 31. The embedded portion 51 may be embedded in the inner periphery 11d of the second extending portion 11b of the door glass run 10 by insert molding.

The second extending portion 11b of the door glass run 10 may include an encapsulation 99 surrounding the embedded portion 51, and the encapsulation 99 may be formed on the inner periphery 11c of the second extending portion 11b of the door glass run 10. The shape of the encapsulation 99 may be determined by an insert mold. The embedded portion 51 may be firmly embedded by the encapsulation 99 so that the second extending cover portion 35 may be integrally coupled to the second extending portion 11b of the door glass run 10.

According to an exemplary embodiment, a support protrusion 55 may extend by a predetermined length "s" from an end of the embedded portion 51, as illustrated in FIG. 21, and the axis of the support protrusion 55 may be substantially perpendicular to the axis of the embedded portion 51. The support protrusion 55, as illustrated in FIG. 24, may extend along the second extending cover portion 35. In the insert molding process, the embedded portion 51 may be firmly coupled to the encapsulation 99 of the door glass run 10 by the support protrusion 55, and the support protrusion 55 may be a pivot point of the inner cover 30 when the second extending cover portion 35 of the inner cover 30 is mounted on the second extending portion 3b of the door frame 3 so that the second extending cover portion 35 of the inner cover 30 may pivot on the support protrusion 55. In addition, resistance to deformation of the second extending cover portion 35 of the inner cover 30 may be increased by the support protrusion 55.

Referring to FIGS. 21 and 24, the support protrusion 55 may have at least one first through hole 55a. During the insert molding process, as a molten material forming the door glass run 10 fills the first through hole 55a of the support protrusion 55, the embedded portion 51 may be firmly coupled to the encapsulation 99 of the door glass run 10.

As illustrated in FIG. 21, the embedded portion 51 may have at least one second through hole 51b. During the insert molding process, as a molten material forming the door glass run 10 fills the second through hole 51b of the embedded portion 51, the embedded portion 51 may be firmly coupled to the encapsulation 99 of the door glass run 10. The axis of the second through hole 51b may be perpendicular to the axis of the first through hole 55a so that the embedded portion 51 may be more firmly coupled to the second extending portion 11b of the door glass run 10.

As illustrated in FIG. 21, the extension wall 52 may be configured to cover the inner periphery 84b of the second extending portion 3b of the door frame 3.

Referring to FIG. 21, the inboard side wall 53 may be spaced apart from the second extending portion 11b of the door glass run 10 toward the interior space of the vehicle. The inboard side wall 53 may have a first contact surface 53a contacting the inboard side wall 84c of the first extending 3a of the door frame 3. The inboard side wall 53 may be configured to cover the inboard side wall 84c of the second extending portion 3b of the door frame 3.

Referring to FIGS. 20-21, the clip portion 54 may be angled from the inboard side wall 53, and the clip portion 54 may be curved. The clip portion 54 may be connected to be elastically deformed with respect to the inboard side wall 53, and the clip portion 54 may have a free end 54b. The clip portion 54 may have a second contact surface 54a contacting the outer peripheral wall 84a of the second extending portion 3b of the door frame 3.

When the second portion 11b of the door glass run 10 is fitted into the second extending portion 3b of the door frame 3, the clip portion 54 may elastically cover at least a portion of the outer peripheral wall 84a of the second extending portion 3b of the door frame 3 (see portion "d2" in FIG. 21), and thus the clip portion 54 may be firmly coupled to the second extending portion 3b of the door frame 3.

According to another exemplary embodiment, the thickness of the clip portion 54 may be gradually reduced from the edge of the inboard side wall 53 toward the free end 54b of the clip portion 54 so that the clip portion 54 may be elastically deformed more easily.

Figure 22:
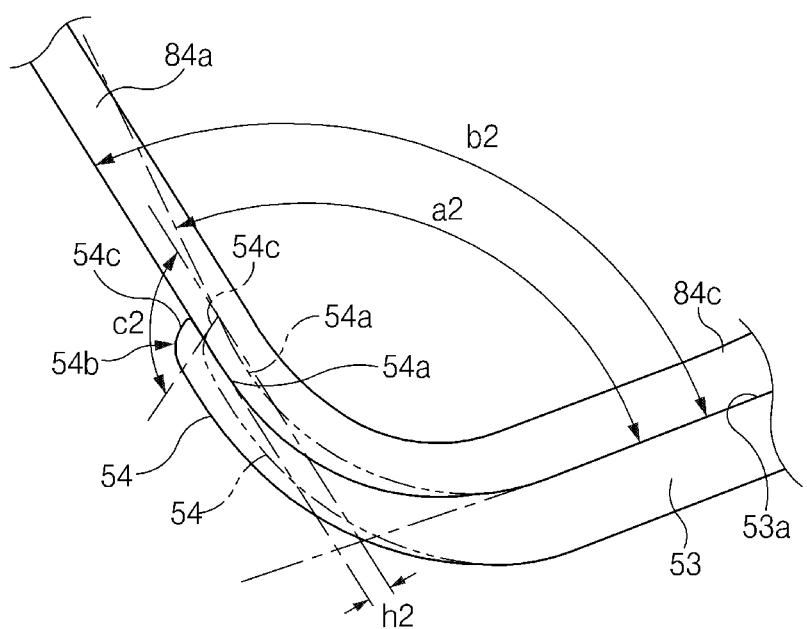
FIG. 22 illustrates an enlarged view of a clip portion of FIG. 21.

The second contact surface 54a of the clip portion 54 may be curved with at least one radius of curvature, and the second contact surface 54a of the clip portion 54 may be inclined at a first angle of inclination a1 with respect to the first contact surface 53a of the inboard side wall 53 (see a two-dot chain line indicated by reference numeral 54 in FIG. 22). That is, the first angle of inclination a1 may be an angle between the first contact surface 53a of the inboard side wall 53 and the second contact surface 54a of the clip portion 54. In particular, the first angle of inclination a1 may be an angle of intersection between the first contact surface 53a of the inboard side wall 53 and a tangent line at an end point of the second contact surface 54a.

The outer peripheral wall 84a of the second extending portion 3b of the door frame 3 may be inclined at a second angle of inclination b1 with respect to the first contact surface 53a of the inboard side wall 53. That is, the second angle of inclination b1 may be an angle between the first contact surface 53a of the inboard side wall 53 and the outer peripheral wall 84a of the second extending portion 3b of the door frame 3.

According to another exemplary embodiment, the first angle of inclination a2 may be less than the second angle of inclination b2, and the clip portion 54 indicated by the two-dot chain line in FIG. 22 may interfere with the outer peripheral wall 84a of the door frame 3 by a predetermined thickness h2. Here, the clip portion 54 indicated by the two-dot chain line in FIG. 22 may indicate a state before the second extending cover portion 35 of the inner cover 30 is assembled to the second extending portion 3b of the door frame 3, and the clip portion 54 indicated by a solid line in FIG. 22 may indicate a state in which the second extending cover portion 35 of the inner cover 30 is assembled to the second extending portion 3b of the door frame 3.

In particular, as the clip portion 54 indicated by the two-dot chain line in FIG. 22 is inclined at an angle less than that of the outer peripheral wall 84a of the second extending portion 3b of the door frame 3 (a2<b2), the clip portion 54 indicated by the solid line in FIG. 22 may be forcedly fitted (that is, tight fit) to the outer peripheral wall 84a of the second extending portion 3b of the door frame 3.

In addition, as the first angle of inclination a2 is less than the second angle of inclination b2, the clip portion 54 may be accurately matched to the outer peripheral wall 84a of the second extending portion 3b of the door frame 3 even if the manufacturing tolerance of the clip portion 54 and the manufacturing tolerance of the outer peripheral wall 84a of the second extending portion 3b of the door frame 3 occur, and thus there may be no gap between the clip portion 54 and the outer peripheral wall 84a of the second extending portion 3b.

The clip portion 54 may further include a chamfer 554c formed at the free end 54b, and the chamfer 54c may be inclined at a third angle of inclination c2 with respect to the outer peripheral wall 84a of the second extending portion 3b of the door frame 3. For example, the third angle of inclination c2 may be an obtuse angle of about 130°. As the chamfer 54c having the third angle of inclination c2 is formed at the free end 54b of the clip portion 54, the free end 54b of the clip portion 54 may be prevented from coming off the outer peripheral wall 84a of the second extending portion 3b of the door frame 3, thereby avoiding the creation of a step between the free end 54b of the clip portion 54 and the outer peripheral wall 84a of the second extending portion 3b of the door frame 3.

As set forth above, according to the exemplary embodiments of the present disclosure, the corner cover may be integrally formed with the corner portion of the door glass run, thereby reducing manufacturing costs and improving ease of assembly.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A cover for a door frame, the cover comprising:
a sealing member mounted to the door frame; and
an inner cover covering at least a portion of the sealing member and at least a portion of the door frame,
wherein the inner cover comprises:
an embedded portion which is embedded in the corner portion of the sealing member;

an extension wall which extends from the embedded portion toward an interior space of the vehicle;

an inboard side wall which is bent at a predetermined angle from the extension wall; and a clip portion which extends from the inboard side wall toward an outside of the vehicle, wherein the clip portion elastically covers at least a portion of an outer peripheral wall of the door frame, wherein the extension wall, the inboard side wall, and the clip portion form a U-shaped section, and the clip portion is opposed to the extension wall.

2. The cover according to claim a, wherein the clip portion is elastically coupled to the outer peripheral wall of the door frame when the sealing member is mounted to the door frame.

3. The cover according to claim a, wherein:

the inboard side wall of the inner cover has a first contact surface contacting an inboard side wall of the door frame, the clip portion of the inner cover has a second contact surface contacting the outer peripheral wall of the door frame, and a first angle of inclination between the first contact surface and the second contact surface is less than a second angle of inclination between the first contact surface and the outer peripheral wall of the door frame.

4. The cover according to claim a, wherein the clip portion of the inner cover has a gradually reduced thickness toward a free end thereof.

5. The cover according to claim a, wherein:

the clip portion of the inner cover further includes a chamfer provided at a free end thereof, and the chamfer is inclined at an obtuse angle with respect to the outer peripheral wall of the door frame.

6. The cover according to claim a, wherein the sealing member includes an encapsulation surrounding the embedded portion of the inner cover.

7. The cover according to claim a, wherein:

the embedded portion of the inner cover has a support protrusion, and an axis of the support protrusion is perpendicular to an axis of the embedded portion.

8. The cover according to claim 7, wherein the support protrusion has at least one first through hole which is filled with a molten material in an insert molding process.

9. The cover according to claim 8, wherein:

the embedded portion has at least one second through hole which is filled with a molten material in the insert molding process, and an axis of the second through hole is perpendicular to an axis of the first through hole.

10. The cover according to claim 1, wherein the inner cover and the sealing member are made of materials having chemical affinity.

11. The cover according to claim 1, wherein:

the sealing member is a door glass run attached to an inner periphery of the door frame, the inner cover has a shape corresponding to the corner portion of the door glass run, and a portion of the inner cover is embedded in the door glass run so that the inner cover and the door glass run form the unitary one-piece structure.

12. The cover according to claim 1, wherein:

the sealing member is a door glass run attached to an inner periphery of the door frame, the door frame includes a first extending portion extending along a first direction, a second extending portion extending along a second direction, a corner portion connecting between the first extending portion and the second extending portion, and the inner cover includes a corner cover portion covering the corner portion of the door frame, a first extending cover portion covering the first extending portion of the door frame, a second extending cover portion covering the second extending portion of the door frame.

* * * * *